United States Patent [19]
Myers et al.

[11] Patent Number: 5,909,291
[45] Date of Patent: Jun. 1, 1999

[54] COLOR MATCHING APPARATUS AND METHOD

[75] Inventors: Robin D. Myers, Pleasanton; Keith McGreggor, San Jose; Robert Johnson, Canoga Park; Konstantin Othmer, San Jose, all of Calif.

[73] Assignee: Apple Computer, Inc., Cupertino, Calif.

[21] Appl. No.: 08/480,957

[22] Filed: Jun. 7, 1995

Related U.S. Application Data

[63] Continuation of application No. 08/226,114, Apr. 8, 1994, abandoned, which is a continuation of application No. 07/854,309, Mar. 19, 1992, abandoned.

[51] Int. Cl.$^6$ .............................. H04N 1/21; H04N 1/46
[52] U.S. Cl. ........................ 358/523; 359/444; 359/448; 359/457
[58] Field of Search .................................. 358/500, 501, 358/518, 520, 521, 523, 524, 400, 401, 442, 443, 444, 445, 448, 455, 456, 457, 458, 460

[56] References Cited

U.S. PATENT DOCUMENTS

| | | |
|---|---|---|
| 4,500,919 | 2/1985 | Schreiber . |
| 4,751,535 | 6/1988 | Myers . |
| 4,843,573 | 6/1989 | Taylor et al. . |
| 4,875,032 | 10/1989 | McManus et al. . |
| 4,941,038 | 7/1990 | Walowit ................................... 358/80 |
| 4,985,853 | 1/1991 | Taylor et al. . |
| 4,992,861 | 2/1991 | D'Errico ................................... 358/75 |
| 5,073,818 | 12/1991 | Iida . |
| 5,184,214 | 2/1993 | Tatsumi ..................................... 358/75 |
| 5,185,661 | 2/1993 | Ng ............................................. 358/75 |
| 5,200,817 | 4/1993 | Birnbaum . |
| 5,235,432 | 8/1993 | Creedon et al. ........................ 358/479 |
| 5,402,253 | 3/1995 | Seki ........................................ 358/518 |

OTHER PUBLICATIONS

Engeldrum, Four Color Reproduction Theory for Dot Formed Imaging Systems, Journal of Imaging Technology, vol. 12, No. 2, Apr., 1986, pp. 126–130.

A Planning, Guide for Developers, Kodak Photo CD System, May, 1991, pp. i and 1–25.

Taylor, et al., Tektronix HVC: A Uniform Perceptual Color System for Display Users, Tektronix Laboratories, Beaverton, Oregon, Date Unknown.

Primary Examiner—Bentsu Ro
Attorney, Agent, or Firm—Burns, Doane, Swecker & Mathis, L.L.P.

[57] ABSTRACT

A color matching system initializes a translator by storing profiles of source and destination color devices which include the coordinates in a calibrated color space of the colorants produced in the source and destination devices and a tonal reproduction curve for each device. Mixing equations and parameters are precomputed to be used in matching calculations of an image including color pixels to be matched. The color gamut is divided into mixing regions in which a given point can be produced by a mixture of two chromatic colorants and the achromatic colorants of the destination device. A technique for selecting a mixing region is included which is based on the slopes of vectors defining the colorants of the destination device, and the sample color to be produced. Colors that are out of the gamut of the destination device are adjusted according to precomputed parameters in order to preserve the lightness, chromaticity, or other selected characteristics of the sample color as suits the need of a particular application. The system is particularly suited for computer systems independent of the source and destination devices to be used, and can be adapted to run with a translation cache to enhance the speed of operation of translating a color image on one device for display on a second device.

44 Claims, 16 Drawing Sheets

TRC for a typical CRT monitor

TRC for a printer

SELECT MIXING REGION

"STRAIGHTEN" C — 355

IS X POSITIVE ? — 356

357
$m_c < m_1$, MR = $P_1/P_6$,
$m_c < m_2$, MR = $P_2/P_1$,
$m_c < m_3$, MR = $P_3/P_2$,
ELSE MR = $P_4/P_3$

358
$m_c < m_4$, MR = $P_4/P_3$,
$m_c < m_5$, MR = $P_5/P_4$,
$m_c < m_6$, MR = $P_6/P_5$,
ELSE MR = $P_1/P_6$

PRESERVE LIGHTNESS

PRESERVE SATURATION

COLOR MATCHING APPARATUS AND METHOD

This application is a Continuation of Ser. No. 08/226,114, filed Apr. 8, 1994, now abandoned, which is a continuation of Ser. No. 07/854,309, filed Mar. 19, 1992, now abandoned.

BACKGROUND OF THE INVENTION

1. Field of the Invention

The present invention relates to color matching systems, or to systems for translating data representing a color from a source color graphics device to data representing a color in a destination color graphics device.

2. Description of Related Art

A large number of color graphic devices, such as CRT display systems, printers, plotters, film recorders, programs using color, and others are now available to computer users. This explosion in color technology complicates the problem of matching color amongst the various devices. That is, colors created for a CRT screen are not typically reproduced well on an ink jet printer, and likewise for other combinations of source and destination devices.

Colors have been characterized by three components; luminance, hue, and saturation or chroma. This fact has been translated into a variety of color spaces which have been calibrated based on a standard human perception of colors. A common calibrated color space is referred to as the CIE tristimulus space. Another commonly used calibrated space is called the CIE chromaticity space. The advantages of the CIE tristimulus coordinates arise from the fact that the coordinates are always positive in value, the entire range of color vision is represented, and the color mixing equations are linear. There are a wide variety of other color spaces that have standardized definitions, and could be considered a calibrated color space, such as L*u*v*, and L*a*b.

Other color spaces, such as RGB, have no standardized definition. They provide virtual devices with simple conceptual models, rather than precise standard models. These conceptual models allow artists or programmers to create colors for virtual devices independent of production equipment. These colors can then be supplied to production equipment and yield at least intuitively consistent results.

Additional background concerning the wide variety of "color spaces" is found in Billmeyer, Jr., et al., *PRINCIPLES OF COLOR TECHNOLOGY*, 2nd Ed., John Wiley & Sons, 1981; Taylor, et al., *Tektronix HVC: A Uniform Perceptual Color System for Display Users*, Tektronix Laboratories, Beaverton, Oreg., (date unknown); and Engeldrum, "Four Color Reproduction Theory for Dot Formed Imaging Systems", *Journal of Imaging Technology*, Vol. 12, No. 2, Apr., 1986, pp. 126–130.

Color matching is the process of determining the combination of destination system colorants that will produce a color which matches a color produced on a source device. To achieve color matching, careful balancing of the hue, chroma, and luminance constituents of the source color must be accomplished. Further, often it is not possible to produce a source color on a destination system. Thus, some adjustment to the hue, chroma, and/or luminance of the source color may be necessary to achieve a producible color.

Also, it may be important to compensate for perceptual factors in color science, such as metamerism and color constancy, by adjustments to the destination color to achieve a desired color effect. Metamerism is the effect where two samples will match under one set of conditions, but do not match under different conditions. The phenomena of color constancy arises because the human visual system constantly readjusts the color balance of our perception to maintain a constant interpretation of color as illumination changes. For instance, the achromatic or gray colors on the source and destination devices may not match because of differences in colorants and media among source and destination devices. Thus, colors that appear gray on a first device, may not appear gray on a destination device unless an adjustment is made to account for these perceptual effects.

Accordingly, in any color matching algorithm, balancing of the three color constituents must be made to achieve a perceptually pleasing result. Typically, the luminance component, also called lightness, carries the most information and should be given first priority in a matching algorithm. See Hunt, R. W. G., *The Reproduction of Color in Photography, Printing and Television*, 4th Ed., Fountain Press, Tolworth, England, 1987, pp. 43–44. Hue is often considered the next most important component. The chroma, also called saturation, is often considered the least important component in color matching algorithms, and is the one most likely to vary among production devices.

Prior art systems for performing color matching are typified by time consuming algorithms such as disclosed in Myers, U.S. Pat. No. 4,751,535. The Myers patent is incorporated by reference for providing an excellent discussion of the background of color matching. These algorithms have proved too slow for practical application. Also, the prior art algorithms are typically optimized for single source and destination device pairs.

Alternatively, prior art systems use very large look-up table systems which require vast storage for accurate color translation. These large table look-up systems have been too costly and inflexible for practical use, except for specialized systems. Furthermore, the large table lookup systems are limited to single source and destination combinations and cannot be easily expanded to other devices.

Accordingly, it is desirable to provide a method and an apparatus for translating a color from a source device to a color on a destination device that operates quickly, that does not require huge amounts of data storage, and can be applied independent of the source and destination devices.

SUMMARY OF THE INVENTION

The present invention provides highly efficient apparatus and methods for translating input data identifying colorant amounts in a color pixel from a first color graphic device to output data identifying colorant amounts in a color pixel in a second color graphic device.

According to one aspect, the invention can be characterized as a method which is readily adaptable to a plurality of color graphic devices acting as source or destination devices. The method according to this aspect comprises:

correcting independent of the destination device, the input data for anomalies in the source color graphic device;

converting the corrected input data to coordinates of a color point in a calibrated color space;

calculating colorant amounts for the destination device in response to the coordinates of the color point in the calibrated color space;

correcting independent of the source device the calculated colorant amounts for anomalies in the destination device; and applying the corrected colorant amounts to the destination device.

According to another aspect, the method is characterized by a very fast technique for calculating the colorant amounts for the destination device in response to the coordinates of the color point in the calibrated color space. According to this aspect, the destination device has a color profile including coordinates in the calibrated color space of a plurality of chromatic colorants produced by the destination device and at least one achromatic color produced by the destination device. The profiles include mixing regions for the calibrated color space within which a point representing the color in the calibrated color space may be represented by a mixture including two chromatic colorants, and one or more achromatic colorants produced by the destination device. The step of calculating the colorant amounts for the destination device involves selecting a mixing region, and computing the colorant amounts in response to the selected mixing region. By selecting the mixing regions quickly, large advances over the prior art color matching algorithms are provided. In this aspect, the mixing regions are selected according to a method which can be characterized as follows:

determining slopes of colorant vectors from an achromatic point to the coordinates of each of the plurality of colorants;

determining a slope of a sample vector from the achromatic point to the coordinates of the color point; and selecting a mixing region in response to a comparison of the slope of the sample vector to determined slopes of the colorant vectors.

According to yet another aspect of the present invention, the technique for calculating the amount of colorants for the destination device includes a routine for handling colors that are outside the gamut of the destination device. According to this aspect, the method of the present invention detects whether the color point lies outside the color gamut of the destination device. This can be determined in response to the first calculation of the colorant amounts. For instance, if the calculated colorant amounts exceed the amounts available on the destination device, then the color point is determined to be out-of-gamut. If the color point lies outside the gamut, then a sample point is computed according to the present invention within the gamut that matches the color point according to a predetermined function, and the sample point is used in place of the color point to calculate colorant amounts of the destination device. The predetermined function can preserve lightness, saturation or chromaticity of the color point as determined by a particular application of the color matching routine.

In a preferred technique for computing the sample point according to the present invention includes the steps of computing a crosswhite vector and a crossblack vector for each of the mixing regions, wherein the crosswhite vector is normal to a surface defined by coordinates of a colorant representing white and of two chromatic colorants of the mixing region, and the crossblack vector is normal to a surface defined by coordinates of a color representing black and of two chromatic colorants of the mixing region. Also, the coordinates of a gray point along a line between the achromatic colorants produced on the destination device are computed. The sample point is determined in response to a projection of a vector from an achromatic colorant to the out-of-gamut color point onto the crosswhite or crossblack vector, and a projection of the vector from the gray point to the out-of-gamut color point along the crosswhite or crossblack vector.

The method according to the present invention is particularly suited for implementation in a color translation apparatus which is characterized by a profile store, which stores independently derived profiles of various source and destination devices. A translation module is included in the translator which is responsive to input data identifying colorant amounts from a first color graphic device, for translating the input data to output data identifying colorant amounts in a second color graphic device. This translation module is responsive to the stored profiles to compute the destination colorant amounts with high efficiency for a wide variety of color graphic devices.

According to one aspect, the profile store stores precomputed mixing equations, or mixing matrices, of the destination devices, precomputed crosswhite and crossblack vectors, and precomputed correction factors to account for differences between the color gamuts of the source and destination devices. By providing these precomputed parameters in a profile store, the speed of computation of a matching algorithm is vastly improved.

Alternatively, the profile store may include profiles which have limited information, including the coordinates within the calibrated color space of the colorants produced in the color graphic devices. An initialization module is included which is responsive to the stored coordinates for precomputing the mixing matrices, crosswhite and crossblack vectors, and correction factors for active source and destination device pairs. Also, the profile includes tonal reproduction curves for the real color graphic devices used by the system to compensate for anomalies in the actual devices.

According to another aspect, the translator includes a translation cache for storing translations. The translation cache is particularly useful when translating large numbers of pixels, such as in a video display, and can greatly increase the speed of translation of entire images.

After initialization, and setting up a translation cache, the translator, according to the present invention, receives input data which identifies colorant amounts for a first color graphic device, and searches the translation cache for a translation of the output data. If a cache hit occurs, then the output data is supplied. If a cache miss occurs, then the apparatus executes programs for accomplishing the color matching method outlined above. These methods are responsive to the prestored profiles, including mixing equations, and other parameters involved in the matching equations.

According to yet another aspect of the present invention, a translation apparatus or method is provided by which the operator can select by means of a software switch or similar technique, one of a plurality of effects in out-of-gamut adjustment, or one of a plurality of source to destination gamut corrections, such as corrections of the source gamut to preserve perceptual color, like the gray axis correction, or transformation of the destination gamut in response to the source gamut to preserve chromaticity, such as pseudo-color mapping. Both of these options are provided in a single matching routine without performance penalties.

Thus, the apparatus and method of the present invention provide a system for translating input data representing colors of a source device to output data representing colors for a destination device. The technique is independent of the particular source and destination devices, allows for flexible adjustments and corrections in the matching algorithm, and operates very efficiently.

Other aspects and advantages of the present invention can be seen upon review of the figures, the detailed description and the claims which follow.

DESCRIPTION OF THE PREFERRED EMBODIMENT

A detailed description of preferred embodiments of the present invention is provided. FIGS. 1–7 illustrate the basic overview of the present invention, the calibrated color spaces and tonal reproduction curves, and how gamuts of various color graphic devices may not match.

FIGS. 8–22 illustrate preferred implementations of the color translation system according to the present invention.

Figure 1:
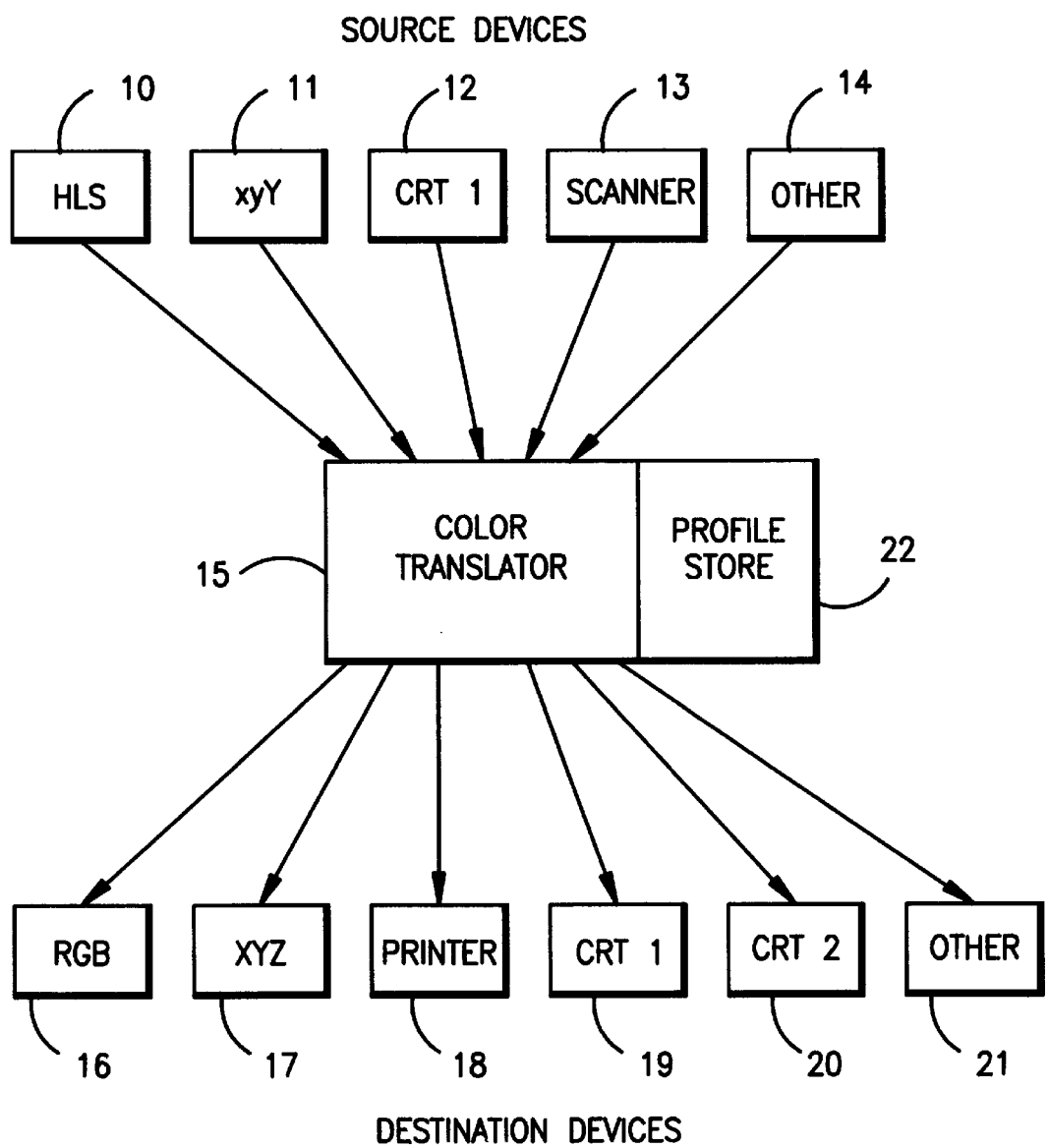
FIG. 1 is a heuristic block diagram of the color translation system of the present invention.

FIG. 1 shows a heuristic diagram of the color matching system of the present invention. The system includes a plurality of source devices 10, 11, 12, 13, 14. The source devices include virtual devices, such as color composition routines, in which colors are manipulated in a color space such as the virtual device 10 using color space HLS, and virtual device 11 using color space xyY. Also, the source devices include real devices such as a cathode ray tube CRT1 12 and a scanner 13. Other real or virtual devices 14 could be included in the system.

The system also includes a plurality of destination devices 16, 17, 18, 19, 20, 21. The destination devices display or store colors in respective color spaces. Also, the destination devices may include virtual devices such as the device 16 and the device 17 which represent colors in the color spaces RGB and XYZ, respectively. The destination devices also include real devices such as printer 18, a CRT1 19, a CRT2 20, and other real and virtual devices 21.

Note that the CRT1 12 of the source devices and the CRT1 19 of the destination devices illustrate heuristically that a single device, either real or virtual, may act as both a source device and as a destination device in the matching system of the present invention.

Coupled between the source devices 10, 11, 12, 13, 14, and the destination devices 16, 17, 18, 19, 20, and 21, is a color translator 15. The color translator includes a profile store 22 which stores the profiles of the source devices and the destination devices used in the matching algorithm. Profiles include independently derived specifications of colorants produced by the color graphics devices in the system, and of any anomalies in the real devices as represented by tonal reproduction curves. A description of the profiles is provided in more detail below.

Figure 2:
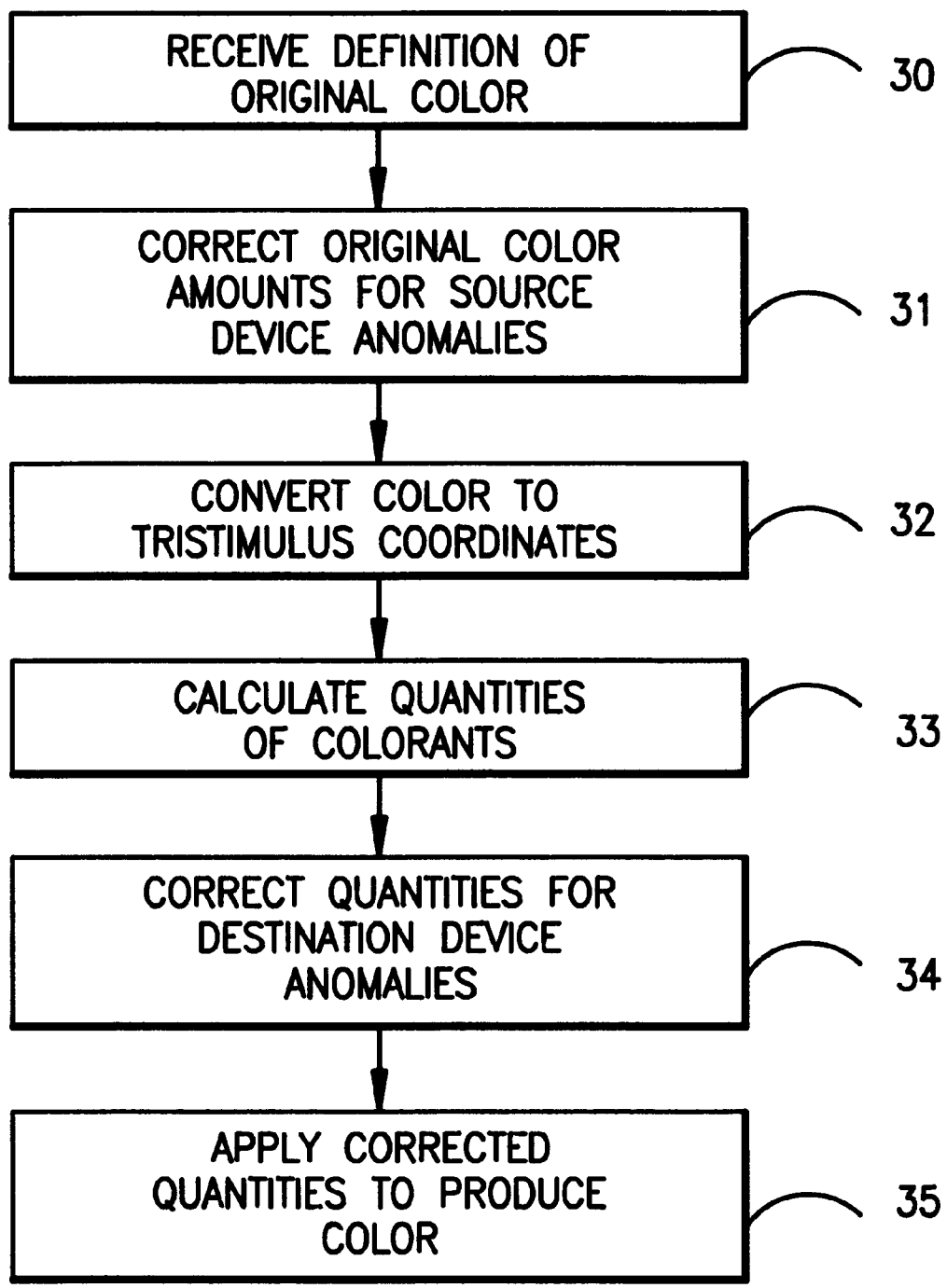
FIG. 2 is an overview flowchart of the translation algorithm.

FIG. 2 is an overview flow chart for operation of the color matching system shown in FIG. 1. In the first step 30, the translator 15 receives a signal defining of the original color from a source device. This definition typically takes the form of a specification of colorant amounts in the color space of the source device. Thus, for virtual device 10, the specification will consist of the HLS coordinates of the color. For source device 12, the definition may include the weights given to the red, green, and blue phosphors for a given pixel on the CRT. In the next step, represented by block 31, the color translator 15 corrects the original color amounts for source device anomalies in response to the tonal reproduction curves in the profile store 22.

After correction in block 31, the translator 15 converts the color to tristimulus coordinates, or to coordinates in another calibrated color space (block 32).

In response to the independent profiles of the source and destination devices, the translator then calculates the quantities of colorants needed in the destination device to reproduce the color of the source device (block 33). Next, an inverse tonal reproduction curve is accessed from the profile store 22 to correct the calculated quantities for destination device anomalies (block 34). Finally, the corrected quantities are applied to the destination device to produce the color (block 35).

Figure 3:
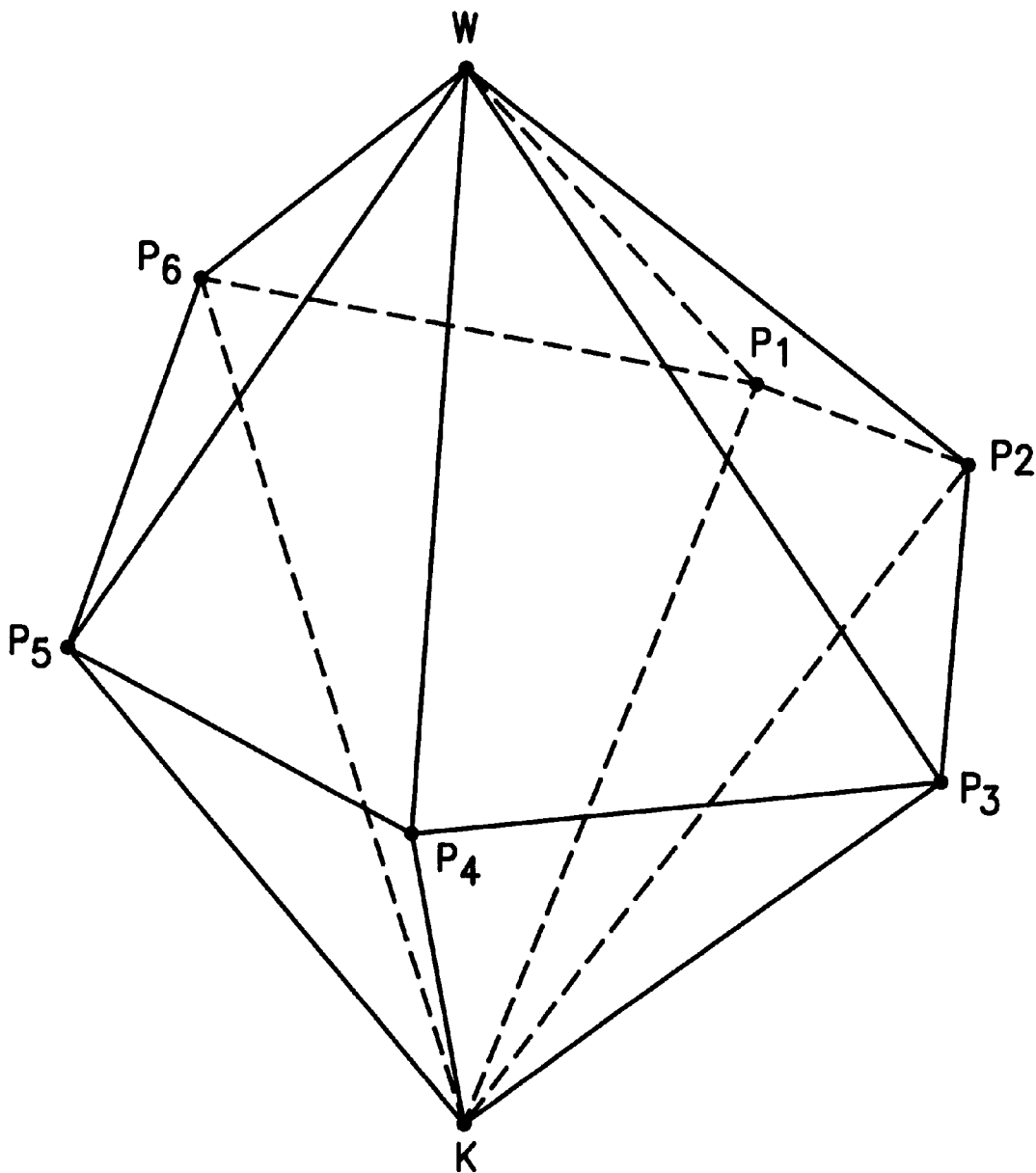
FIG. 3 is a graph illustrating a representative color gamut in a calibrated color space.

FIGS. 3–7 illustrate the characteristics of the profile stored in a preferred embodiment of the present invention. In FIG. 3, a color gamut in the CIE tristimulus coordinate system p(XYZ) is illustrated. The color gamut is represented in the profile according to the present invention by the measured tristimulus coordinates of each of the colorants produced in the destination device. Thus, the gamut of FIG. 3 is totally represented by the XYZ coordinates of each of the chromatic colorants $P_1$–$P_6$, and in addition, the XYZ coordinates of the achromatic colorants white W and black K. The volume of the shape shown in FIG. 3 which is defined by these 8 points represents the gamut of colors that can be produced or displayed on a respective source or destination device.

It is noted that the gamut of FIG. 3 includes six chromatic colorants while a CRT and printer typically include only three chromatic color sources (e.g., red, green, blue, or cyan, magenta, yellow). The balance of the colorants in the gamut of FIG. 3 are determined by mixtures of the three primary color sources of the device. The gamut using six chromatic colorants to represent the color space provides a more accurate representation of the colors that are producible by mixing the primary colorants. Of course, the larger number of points used to represent the gamut, the greater accuracy in color matching can be achieved. It is found, however, that six chromatic colorants plus white and black provide a satisfactory profile of the source or destination devices for most applications.

Figure 4:
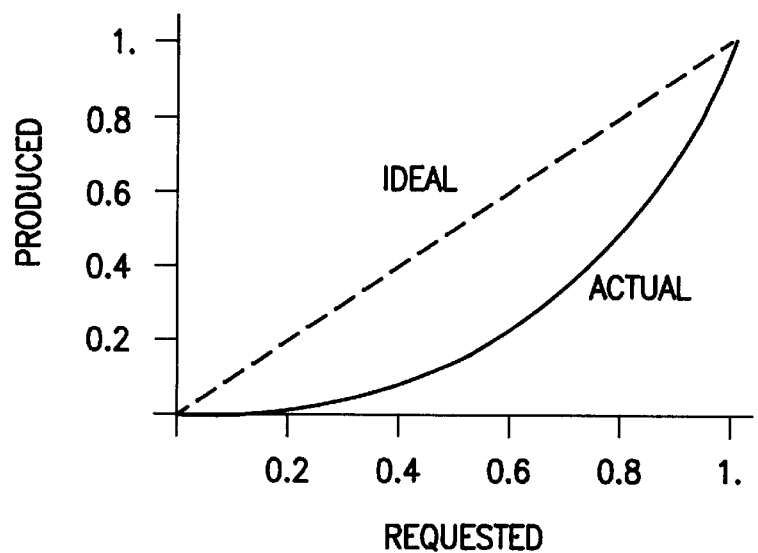
FIG. 4 is a tonal reproduction curve for a typical CRT monitor.
Figure 5:
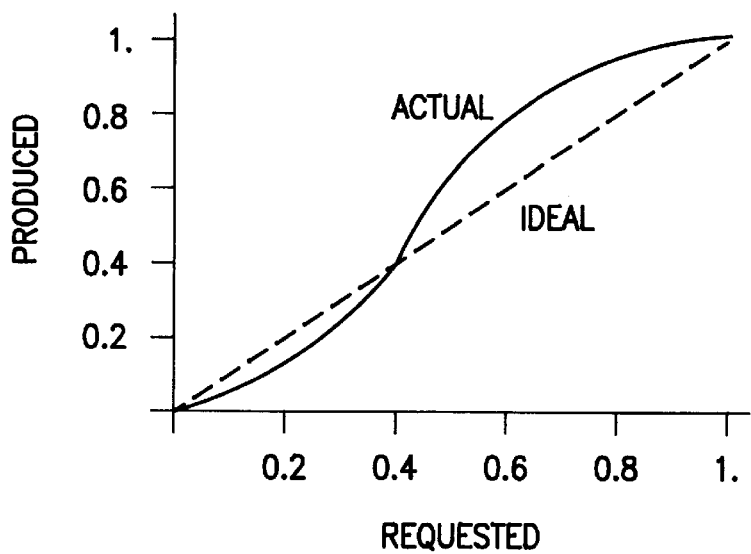
FIG. 5 is a tonal reproduction curve for a typical printer.

FIGS. 4 and 5 provide typical TRC curves. FIG. 4 is a TRC for one colorant, e.g., red, for a typical CRT monitor. The profile will include a TRC for each primary colorant of each real source and destination device. FIG. 5 represents a TRC for a typical printer ink. The TRCs are measured tables with a finite number of samples. Interpolation is used to complete the range of the TRC during use.

A graph of requested versus actual amounts produced for an output process is known as a tonal reproduction curve (TRC). A TRC can be determined by producing a series of samples, for i=1 (x%) through a selected number N (x%) of samples, where N times x%=100%, of increasing colorant amounts on the device for each colorant, measuring the tristimulus or chromaticity coordinates $(X_i, Y_i, Z_i)$ for each amount i, then calculating the actual color amount $a_i$ produced for each sample i from $$a_i = \frac{Q_W - Q_i}{Q_W - Q_P}$$

where Q is the coordinate selected from the tristimulus coordinates X, Y, or Z, such that $Q = \max(\Delta X, \Delta Y, \Delta Z)$ and $\Delta X = X_W - X_P$ $\Delta Y = Y_W - Y_P$ $\Delta Z = Z_W - Z_P$ The quantities $X_P, Y_P, Z_P$ are the tristimulus values for the pure colorant, and $X_W, Y_W, Z_W$ are the tristimulus values for white of the device.

That is the coordinate Q is the tristimulus coordinate (X, Y, or Z) for the colorant with the maximum amount of change across the series.

For example, if the X coordinate for red exhibited the maximum change, then the X coordinates for white $X_W$, the colorant $X_P$, and the sample $X_i$ would be substituted into the above equation to determine the TRC for the red colorant.

The TRC becomes a plot or table of the requested amount i times x% versus the actual color $a_i$ produced for each colorant for a subject device and is independent of the source or destination devices with which the subject device is to be used.

Since there are usually variations in the production and measuring systems, a curve may be fitted to the data and the fitted data used for the final colorant amounts. For example, 10 samples for each colorant may be measured, and interpolation is used to adjust for intermediate values.

Figure 6:
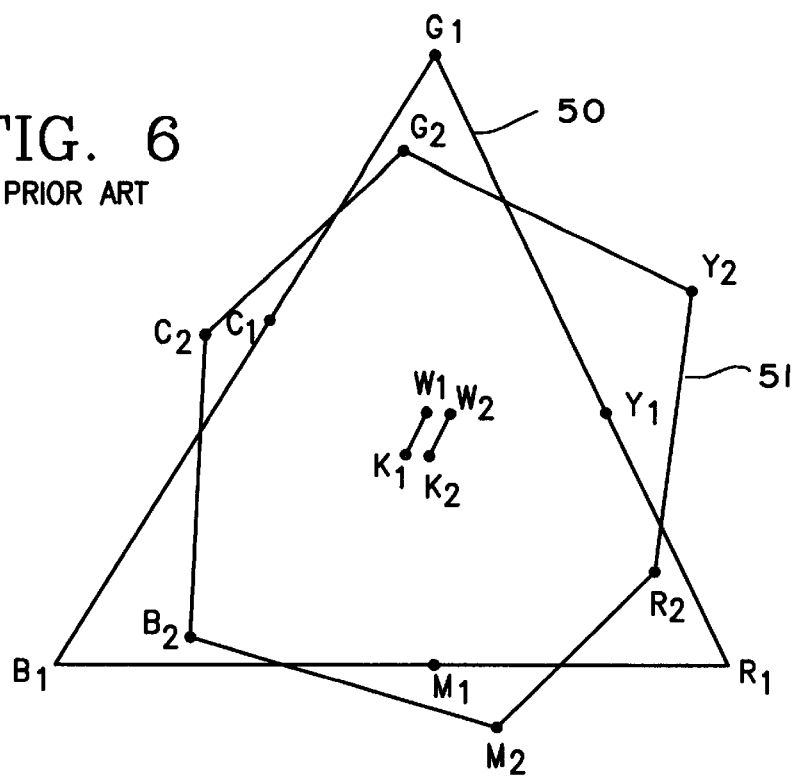
FIG. 6 is a graph illustrating variant color profiles of two color graphic devices.

FIG. 6 illustrates color gamuts of two devices in a manner which emphasizes the differences in the color gamuts. Thus, the illustration in FIG. 6 can be considered a graph in the xyY CIE chromaticity space of a CRT monitor represented by essentially a triangular shaped gamut 100 and of a printer represented by a six sided polygon 101. The CRT monitor includes three primary colorants, red $R_1$, blue $B_1$, and green $G_1$. Three additional chromatic colorants, yellow $Y_1$, magenta $M_1$, and cyan $C_1$, are plotted along the boundary of the triangular shaped region 100. The white $W_1$ and black $K_1$ are illustrated near the center of the triangular region 100 with a gray line extending between the white and black points. Similarly, the printer gamut 101 includes three primary colorants, yellow $Y_2$, magenta $M_2$, and cyan $C_2$. Three additional colorants, red $R_2$, blue $B_2$, and green $G_2$ are produced by mixing the primary chromatic colorants. The white and black points, $W_2$ and $K_2$, are similarly illustrated near the center of the region.

FIG. 6 illustrates several characteristics of the profiles of color graphic devices. First, the gamuts do not match. Thus, a color in the CRT monitor space 50 may not map directly into a color in the printer space 51. Such colors are referred to as out-of-gamut colors. Also, the achromatic colors, white and black, do not match in the respective color graphic devices.

Figure 7:
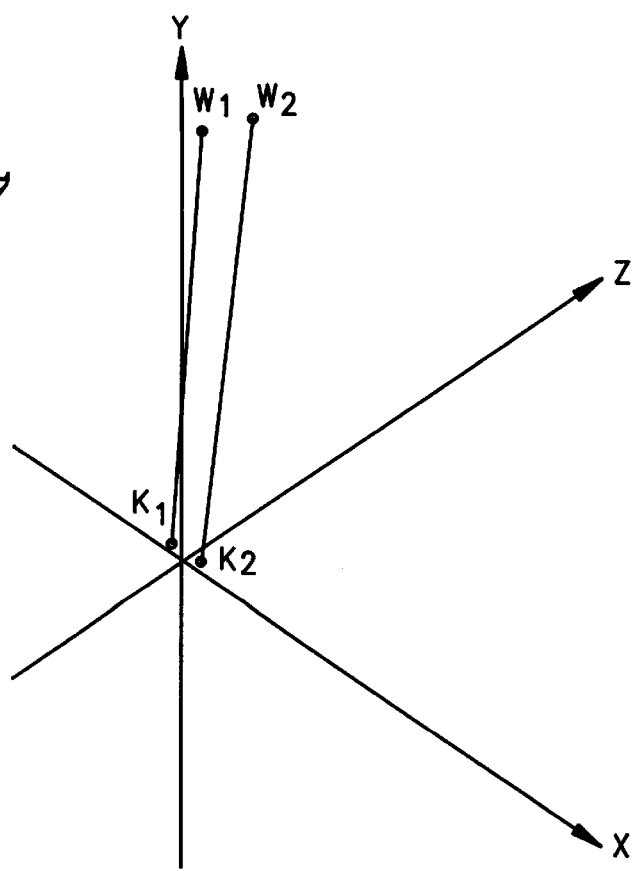
FIG. 7 is a graph illustrating misalignment of the gray axes of the color gamuts in two color graphic devices.

FIG. 7 is a graph shown to illustrate the differences between the gray axes in two devices. For instance, the gamut 50 of the CRT monitor in FIG. 6 includes white point $W_1$ and black point $K_1$ which is illustrated in FIG. 7 in the XYZ tristimulus space. Similarly, the gamut 51 of FIG. 6 includes white point $W_2$ and black point $K_2$. The length of the axis called the gray axis from $W_1$ to $K_1$ does not match the length of the axis from $W_2$ to $K_2$. Also, the respective axes are not parallel.

Therefore, the color profiles stored in the profile store 22 of the matching system shown in FIG. 1 include the coordinates of the colorants in the respective source and destination color graphics devices. The matching algorithm takes into account the device anomalies as represented by the TRCs in the profile store for the respective source and destination devices. These profiles provide the matching algorithm with enough information to specify the differences between the profiles as illustrated in FIGS. 6 and 7 which allow for fast, accurate, and flexible color matching to be performed.

Figure 21:
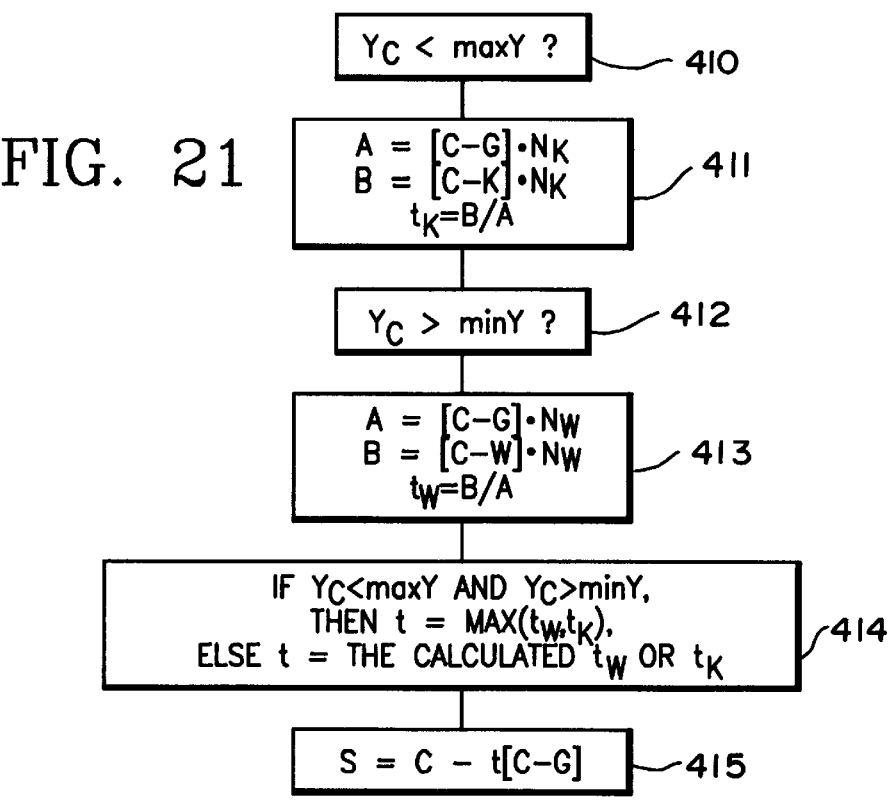
FIG. 21 is a flowchart of a routine for calculating an out-of-gamut projection according to the present invention.
Figure 22:
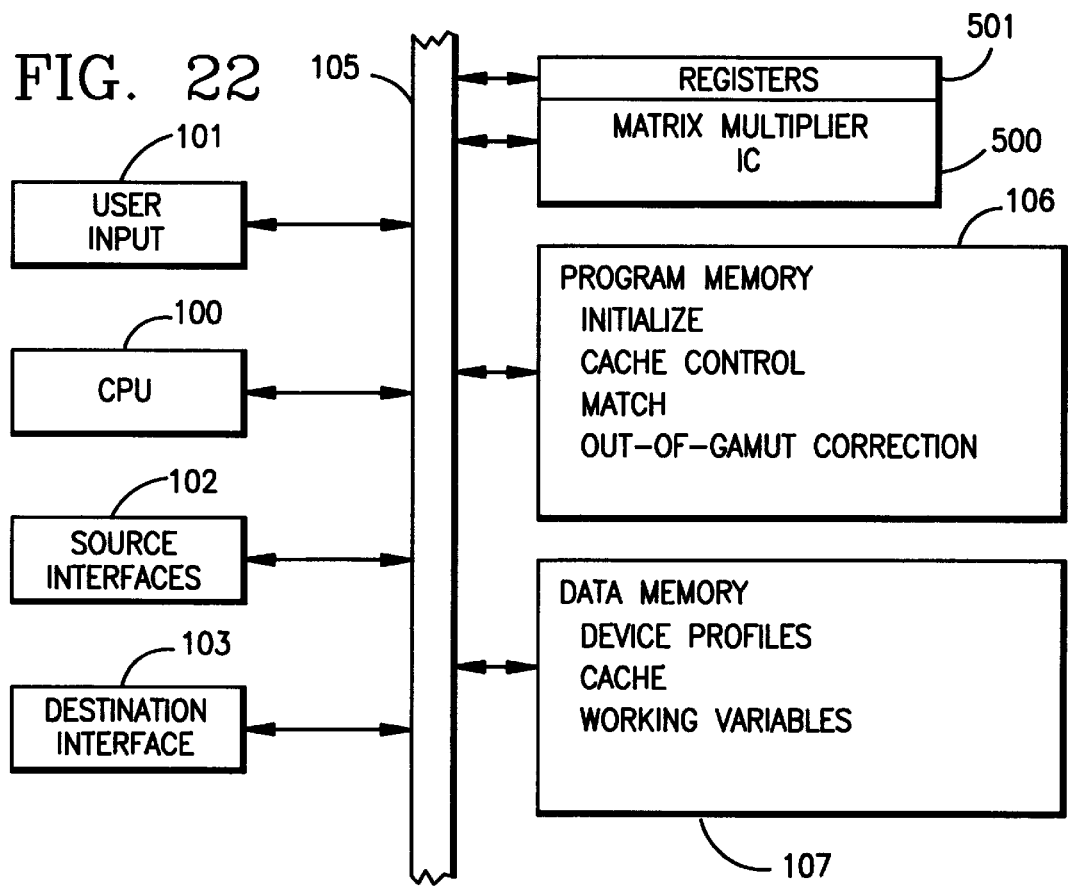
FIG. 22 is a schematic diagram of an alternative color translator system according to the present invention.

FIGS. 8–21 illustrate an implementation of a preferred embodiment of the color translator and profile store 22 of FIG. 1. FIG. 22 provides a schematic diagram of an alternative color translator and profile store which utilizes an integrated circuit matrix multiplier to enhance the speed of operations.

Figure 8:
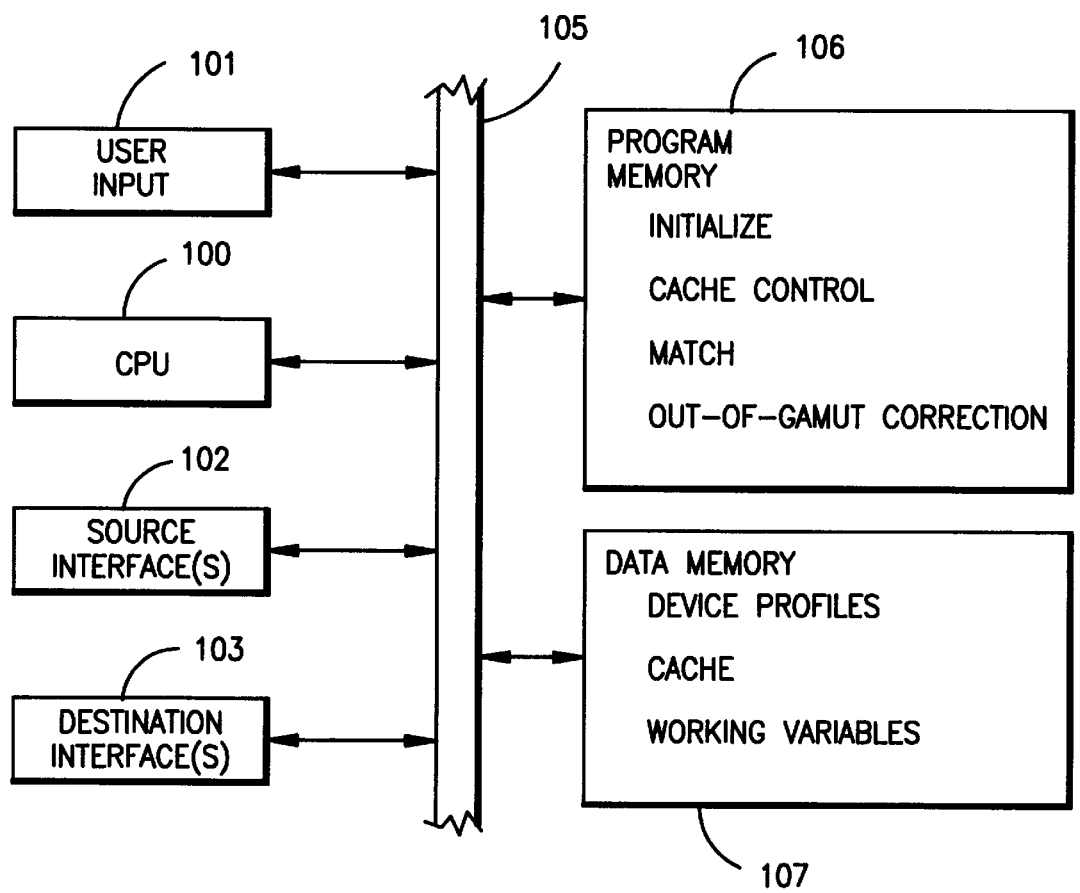
FIG. 8 is a schematic block diagram of a computer system implementing the color translation algorithm of the present invention.

FIG. 8 illustrates one preferred embodiment of the color translator of the present invention. In this preferred embodiment, the color translator comprises a computer system including a central processing unit 100, a user input device 101, such as a keyboard, a source color graphics device interface or interfaces, 102, and a destination color graphics device interface or interfaces, 103. The interfaces 102, 103 are in turn coupled to real color graphics devices, such as scanners, printers, or display systems. The components of the computer system communicate across bus 105. Coupled to bus 105 are a program memory 106 and a data memory 107. The program memory includes an initialize routine, a cache control routine, a match routine, and an out-of-gamut correction routine. The data memory stores the device profiles, provides space for the cache, and provides space for working variables.

Figure 9:
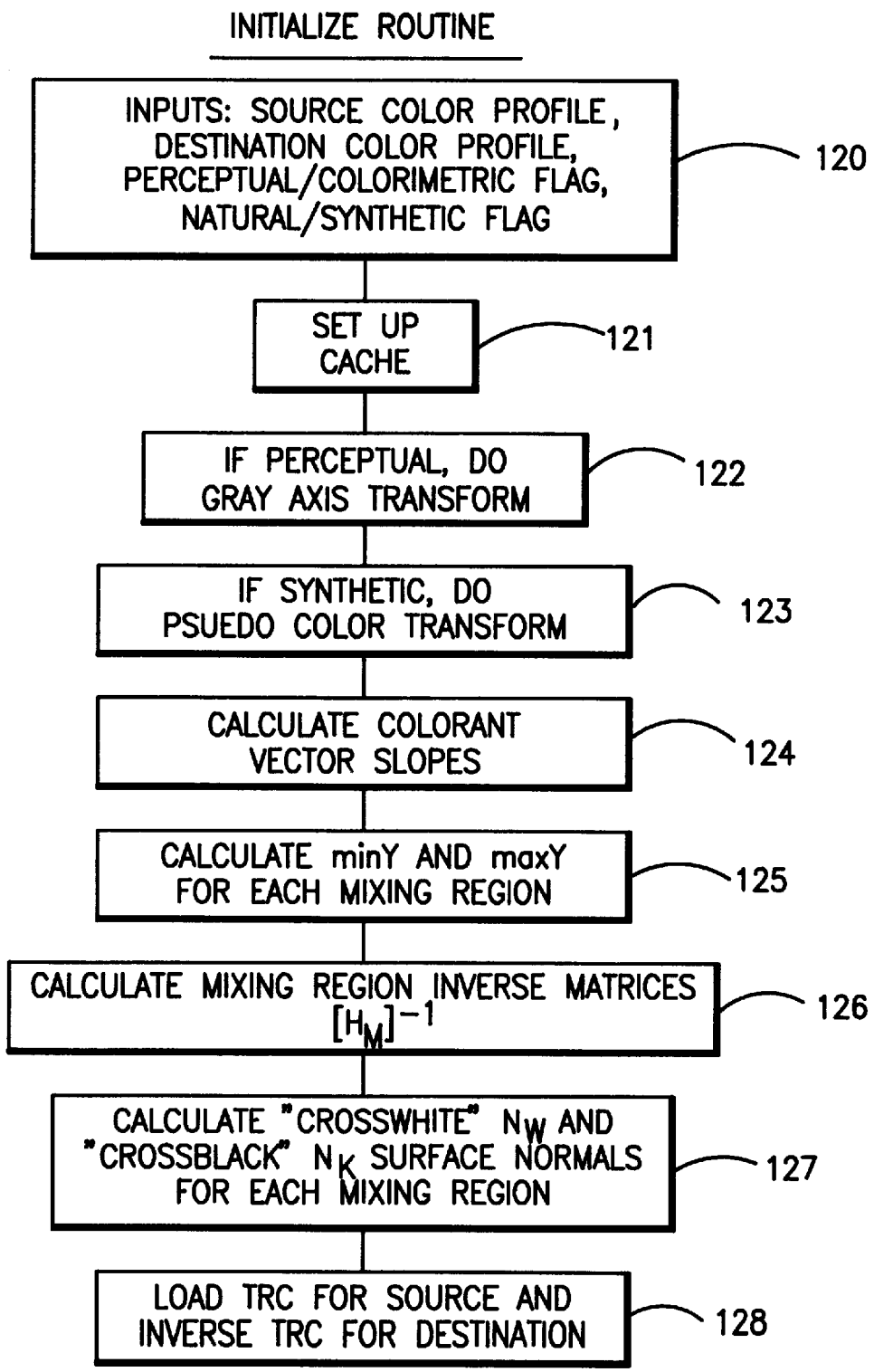
FIG. 9 is a schematic flowchart of an initialization routine used according to the present invention.

The initialize routine is demonstrated in FIG. 9. According to this embodiment of the present invention, the inputs to the initialize routine include independently derived color profiles of color graphics devices. Also, the inputs may include flags used to select selectable features of the translator system (block 120). The flags in this embodiment include a perceptual/colorimetric flag, and a natural/synthetic flag. These flags are used to select options for handling the differences between the source and destination gamuts and for handling techniques for adjusting an out-of-gamut color.

A first step in the initialize routine is to set up a cache for the color translation system (block 121). The cache is particularly useful in systems which will perform a large number of color translations, such as when translating an image including hundreds of thousands or millions of pixels. An implementation of a cache is illustrated with respect to FIG. 10.

After the cache is set up in block 121, the initialize routine performs some calculations on the source and destination profiles in order to set up matching equations and other parameters used in the matching algorithm. As shown in FIG. 9, a first step is to test the perceptual/colorimetric flag. If perceptual flag is set, then a gray axis transform is done which results in deformation of the destination gamut such that achromatic points of the source device gray axis (see FIG. 7) are mapped to corresponding achromatic points in the destination device gray axis (block 122). If the flag is set to generate "calorimetric" results, no gamut transform is done in this step. The gray axis transform results in movement of the axis such that the black points $K_1$ and $K_2$ coincide, and rotation of the axis and proportional scaling of the axis so that the white points $W_1$ and $W_2$ coincide. Details of the gray axis transform are discussed below. This gray axis adjustment is found to result in color matches which are perceived by the observer as matching achromatic colors due to the color constancy effect of the human visual system. Without this gray axis correction, a color on the achromatic axis of a source device may appear to actually include a chromatic colorant when translated to the destination device.

The gray axis transform is accomplished by rotating the destination gamut in the XYZ space so that the gray axis of the destination between points $W_2$ and $K_2$ is aligned with the gray axis of the source between points $W_1$ and $K_1$. Also, rotation is carried out in the plane containing the two gray axes. This rotation may be carried out according to the following equations:

Point P on destination gray axis rotated to $P_1$ on source gray axis.

$$P_1 = K_1 + M(P - K_2)$$

where M is defined as follows:

$$A = W_1 - K_1; \text{ and } a = \frac{A}{\|A\|}$$

$$B = W_2 - K_2; \text{ and } b = \frac{B}{\|B\|}$$

$$M \begin{bmatrix} b \\ a \times b \\ b \times (a \times b) \end{bmatrix} = \begin{bmatrix} \frac{A}{\|B\|} \\ a \times b \\ a \times (a \times b) \end{bmatrix}$$

solving for M:

$$M = \begin{bmatrix} b \\ a \times b \\ b \times (a \times b) \end{bmatrix}^{-1} \begin{bmatrix} \frac{A}{\|B\|} \\ a \times b \\ a \times (a \times b) \end{bmatrix}$$

Because the inverted matrix is orthogonal, the transpose may be substituted as follows:

$$M = \begin{bmatrix} b \\ a \times b \\ b \times (a \times b) \end{bmatrix}^{T} \begin{bmatrix} \frac{A}{\|B\|} \\ a \times b \\ a \times (a \times b) \end{bmatrix}$$

Another method of luminance correction (gray axis) is to reference the colorants to the white during gamut measurement and generation of the TRC's. The exact method depends upon the type of calibration equipment used and the reference methods provided by the manufacturer. For spectrophotometers, the spectrum of each colorant is divided by the spectrum of the white, then the chromaticity coordinates are calculated from the resulting spectrum. This will produce a white with 100 as the Y value and each primary scaled appropriately to the range 0–100.

For a calorimeter, a reading of the white is used for the calibration white. Again, a Y value of 100 should be the result with the other primaries scaled proportionately.

This method of applying the luminance correction during calibration may be a better method for matching systems with the preferred acquisition mode being spectrophotometric measurement.

Next, the natural/synthetic flag is tested (block 123). If natural, then no transform is done. If the synthetic flag is set, the user desires results which preserve saturation and hue. In this case, a pseudo color transform is done as described below with respect to FIGS. 10A and 10B.

Next in the initialize routine, vector slopes are calculated for each of the chromatic colorants (actual and pseudo colorants) in the destination device, from a point on the achromatic axis to the point in the profile representing the colorant (block 124). These values are stored for use in the matching routine. These vectors delimit color mixing regions within the destination device color gamut in which a color can be generated by mixing only two chromatic colorants with the achromatic colorants of the device.

Next in the initialize routine, maxY and minY parameters are determined for each mixing region (block 125). These parameters indicate the highest and lowest Y positions, respectively, in the tristimulus space of the two chromatic colorants used for each mixing region. These values again are used in the matching routine as described below.

For each color mixing region, the amount of colorants necessary to produce a given color $C=(X_C, Y_C, Z_C)$ can be calculated according to the following matrix equations:

The color mixing equations for each mixing region reduce to:

$$X_C = a_{P1}X_{P1} + a_{P2}X_{p2} + a_W X_W + a_K X_K$$

$$Y_C = a_{P1}Y_{P1} + a_{P2}Y_{p2} + a_W Y_W + a_K Y_K$$

$$Z_C = a_{P1}Z_{P1} + a_{P2}Z_{p2} + a_W Z_W + a_K Z_K$$

$$1 = a_{P1} + a_{P2} + a_W + a_K$$

where $a_{P1}$ and $a_{P2}$ represent the fractional amounts of the two chromatic colorants for a mixing region, and $a_W$ and $a_K$ represent the fractional amount of the white and black colorants.

Substituting $1-a_{P1}-a_{P2}-a_W$ for $a_K$:

$$X_C = a_{P1}X_{P1} + a_{P2}X_{P2} + a_W X_W + (1-a_{P1}-a_{P2}-a_W)X_K$$

$$Y_C = a_{P1}Y_{P1} + a_{P2}Y_{P2} + a_W Y_W + (1-a_{P1}-a_{P2}-a_W)Y_K$$

$$Z_C = a_{P1}Z_{P1} + a_{P2}Z_{P2} + a_W Z_W + (1-a_{P1}-a_{P2}-a_W)Z_K$$

where $0 \leq a_{P1}, a_{P2}, a_W, a_K \leq 1$

Rearranging the terms produces $$X_C - X_K = a_{P1}(X_{P1}-X_K) + a_{P2}(X_{P2}-X_K) + a_W(Y_W-Y_K)$$

$$Y_C - Y_K = a_{P1}(Y_{P1}-Y_K) + a_{P2}(Y_{P2}-Y_K) + a_W(Y_W-Y_K)$$

$$Z_C - Z_K = a_{P1}(Z_{P1}-Z_K) + a_{P2}(Z_{P2}-Z_K) + a_W(Z_W-Z_K)$$

Reprsenting in matrix form $$\begin{bmatrix} X_C - X_K \\ Y_C - Y_K \\ Z_C - Z_K \end{bmatrix} = \begin{bmatrix} X_{P1}-X_K & X_{P2}-X_K & X_W-X_K \\ Y_{P1}-Y_K & Y_{P2}-Y_K & Y_W-Y_K \\ Z_{P1}-Z_K & Z_{P2}-Z_K & Z_W-Z_K \end{bmatrix} [a_{P1}\ a_{P2}\ a_W]$$

Solving for $[a_{P1}\ a_{P2}\ aw]$ $$[a_{P1}\ a_{P2}\ a_W] = \begin{bmatrix} X_C - X_K \\ Y_C - Y_K \\ Z_C - Z_K \end{bmatrix} [H_M]^{-1}$$

where $$[H_M]^{-1} = \begin{bmatrix} X_{P1}-X_K & X_{P2}-X_K & X_W-X_K \\ Y_{P1}-Y_K & Y_{P2}-Y_K & Y_W-Y_K \\ Z_{P1}-Z_K & Z_{P2}-Z_K & Z_W-Z_K \end{bmatrix}^{-1}$$

The amount of black is then $a_K = 1 - a_{P1} - a_{P2} - a_W$.

The matrix multiplication may be performed for each of the mixing regions of the production device's gamut. The mixing region is the one where $a_{P1}, a_{P2} \geq 0$. Alternatively, the mixing region can be selected in response to the coordinates of the color point C, and of the colorants produced by the destination device.

As part of the initialize routine, the inverse matching matrices $[H_M]^{-1}$ are precalculated for each mixing region and stored in the data memory of the translator (Block 126). These precomputed, inverse matrices are used in the matching algorithms, as described below.

Next in the initialize routine, the so-called "crosswhite" $N_W$ and "crossblack" $N_K$ surface normals are calculated for each mixing region (block 127).

$$N_W = v_1 \times v_2\ (x\text{ indicating vector cross product})$$

$$v_1 = (X_{P1} - X_W, Y_{P1} - Y_W, Z_{P1} - Z_W)$$

$$v_1 = (X_{P2} - X_W, Y_{P2} - Y_W, Z_{P2} - Z_W)$$

$$N_K = v_1 \times v_2$$

$$v_1 = (X_{P1} - X_K, Y_{P1} - Y_K, Z_{P1} - Z_K)$$

$$v_1 = (X_{P2} - X_K, Y_{P2} - Y_K, Z_{P2} - Z_K)$$

These surface normals are normalized vectors that are perpendicular to the planes represented by the two chromatic colorants ($P_1$, $P_2$) and the white (W) or black (K) achromatic colorants, respectively, of a given mixing region. These crosswhite and crossblack surface normals are used in the out-of-gamut correction routines as described below.

Finally, in the initialize routine, the tonal reproduction curves are loaded for the source colorants and inverse tonal reproduction curves are loaded for the destination colorant (block 128).

To compute an inverse tonal reproduction curve, a TRC such as specified in FIGS. 4 and 5 can be simply inverted by taking the samples along the "produced" axis and determining a "requested" value necessary to generate such produced value. This results in an inverted TRC which is used on the output end of the translation mechanism. The inverted TRC is stored in the data memory 107 in the translator system.

Of course, the initialize routine illustrated in FIG. 9 includes a number of calculations and steps. The order of the steps can be adapted for a particular implementation. Similarly, the use of the flags may or may not be necessary in a given system.

In an alternative system, the parameters and mixing equations calculated in the initialize routine may be stored as part of the source and destination profiles. In such alternative system, the computations done in the initialize routine may be done elsewhere. The initialize routine is preferred for a source and destination independent system.

A type of color correction, very important for spot color, business graphics, presentation graphics, or other graphics areas where the user has a tendency to run the color selectors to the limits, using only highly saturated, synthetic hues, is accomplished by the pseudo color transform referred to above with respect to FIG. 9 (block 123). If the color matching system was applied to these colors without chroma correction like that achieved by the pseudo-color transform, the result would most often be a loss of saturation in the final image, this being produced by the smaller gamuts of many output technologies.

By applying a chroma mapping from the source original to the destination production gamut, relative saturation will be maintained at a loss of color matching. Users will be pleased with the results since the final color will match the intention of the user, not necessarily the color coordinates specified.

Figure 10A:
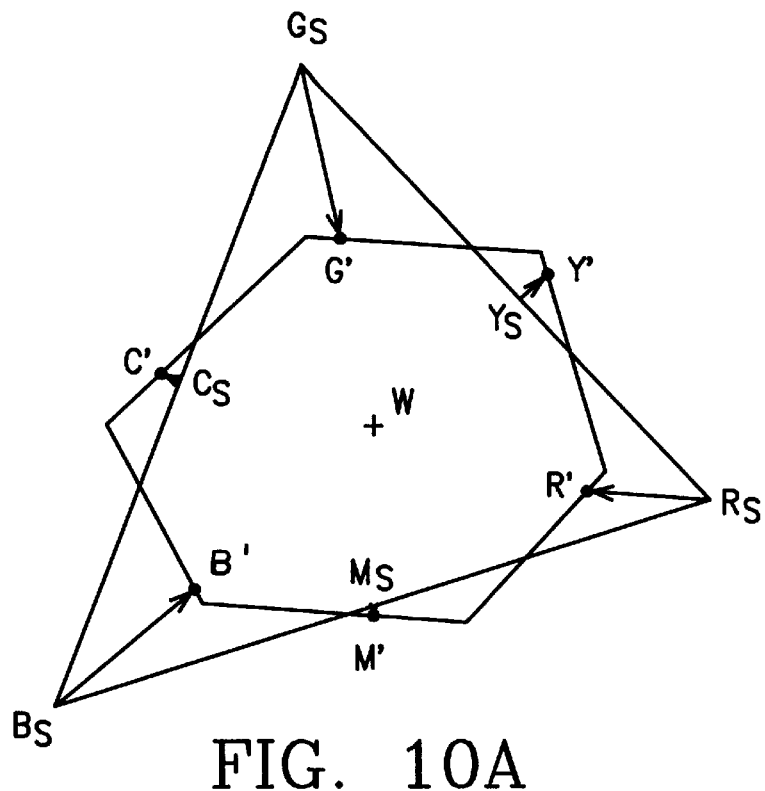
FIGS 10A–10B illustrate pseudo-color gamut transformation according to the present invention.
Figure 10B:
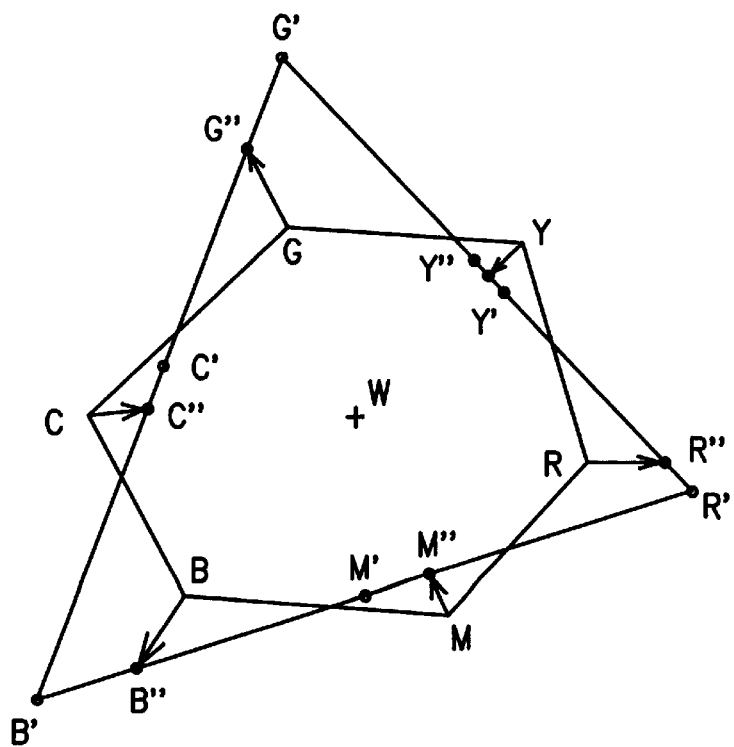

FIGS. 10A and 10B illustrate an example of the transformation for an RGB source to a OMS printer using a CMYK space. This mapping is accomplished by first projecting the source primaries ($R_S$, $M_S$, $B_S$, $C_S$, $G_S$, $Y_S$) onto the destination gamut (R', M', B', C', G', Y') along the constant hue lines from the primaries to the white point, as shown in FIG. 10A.

To calculate the intersection, the parametric equations are solved for the line segment joining two adjacent destination primaries (D1, D2) and the line segment between a source primary (S) and the white point (W) in chromaticity space:

$$x_a = x_{D1} + t_a(x_{D2} - x_{D1})$$

$$y_a = y_{D1} + t_a(y_{D2} - y_{D1})$$

$$x_b = x_W + t_b(x_S - x_W)$$

$$y_b = y_W + t_b(y_S - y_W)$$

are solved for the two parameters $t_a$ and $t_b$ $$t_a = \frac{(x_S - x_W)(y_W - y_{D1}) - (x_W - x_{D1})(y_S - y_W)}{(x_S - x_W)(y_{D2} - y_{D1}) - (x_{D2} - x_{D1})(y_S - y_W)}$$

$$t_b = \frac{(x_{D2} - x_{D1})(y_W - y_{D1}) - (x_W - x_{D1})(y_{D2} - y_{D1})}{(x_S - x_W)(y_{D2} - y_{D1}) - (x_{D2} - x_{D1})(y_S - y_W)}$$

where ($x_{D1}$, $y_{D1}$), ($x_{D2}$, $Y_{D2}$) are the endpoints of the line between two destination primaries (D1, D2) and ($x_S$, $y_S$), ($x_W$, $y_W$) are the endpoints of the second line segment between the source primary (S) and the white point (W).

The intersection s can also be represented with determinants as $$t_a = \frac{\begin{vmatrix} x_S - x_W & x_W - x_{DI} \\ y_S - y_W & y_W - y_{DI} \end{vmatrix}}{\begin{vmatrix} x_S - x_W & x_{D2} - x_{DI} \\ y_S - y_W & y_{D2} - y_{DI} \end{vmatrix}}$$

$$t_b = \frac{\begin{vmatrix} x_{D2} - x_{DI} & x_W - x_{DI} \\ y_{D2} - y_{DI} & y_W - y_{DI} \end{vmatrix}}{\begin{vmatrix} x_S - x_W & x_{D2} - x_{DI} \\ y_S - y_W & y_{D2} - y_{DI} \end{vmatrix}}$$

Each destination primary is checked against each edge of the source gamut until $0 \leq t_a \leq 1$ and $0 \leq t_b$. The parameter $t_a$ is then used to determine the point (e.g., for R') of intersection (x, y, Y) by substitution into the parametric line equation.

$x = x_{D1} + t_a(x_{D2} - x_{D1})$ $y = y_{D1} + t_a(y_{D2} - y_{D1})$ $Y = Y_{D1} + t_a(Y_{D2} - Y_{D1})$

The chromaticity coordinates are converted into tristimulus coordinates $$X = \frac{xY}{y}$$

$$Z = \frac{(1 - x - y)Y}{y}$$

At this point, the mixing ratios using colorants of the destination gamut for the source intersection primaries (G', Y', R', M', B', C') are calculated and stored. A mixing ratio ($a_1$, $a_2$) for the intersection primary R' may include a mixture of 85% destination red and 15% destination magenta, or $a_1 = 0.85$, $a_2 = 0.15$.

As shown in FIG. 10B, the original destination primaries (G, Y, R, M, B, C) are now projected onto the source gamut.

The intersections for this second projection are represented as $$t_a = \frac{\begin{vmatrix} x_D - x_W & x_W - x_{SI} \\ y_D - y_W & y_W - y_{SI} \end{vmatrix}}{\begin{vmatrix} x_D - x_W & x_{S2} - x_{SI} \\ y_D - y_W & y_{S2} - y_{SI} \end{vmatrix}}$$

$$t_b = \frac{\begin{vmatrix} x_{S2} - x_{SI} & x_W - x_{SI} \\ y_{S2} - y_{SI} & y_W - y_{SI} \end{vmatrix}}{\begin{vmatrix} x_D - x_W & x_{S2} - x_{SI} \\ y_D - y_W & y_{S2} - y_{SI} \end{vmatrix}}$$

Each destination primary is checked against each edge of the source gamut until $0 \leq t_a \leq 1$ and $0 \leq t_b$. The parameter $t_a$ is then used to determine the point of intersection (x, y, Y) by substitution into the parametric line equation.

$x = x_{S1} + t_a(x_{S2} - x_{S1})$ $y = y_{S1} + t_a(y_{S2} - y_{S1})$ $Y = Y_{S1} + t_a(Y_{S2} - Y_{S1})$

The chromaticity coordinates are converted into tristimulus coordinates $$X = \frac{xY}{y}$$

$$Z = \frac{(1 - x - y)Y}{y}$$

A new set of twelve pseudo-color primaries (G", G', Y", Y', R", R', M", M', B", B', C", C') is created from these primaries and the source intersection primaries. This results in a transformed destination gamut which completely maps to the source gamut. The full relative saturation range represented in the source gamut is represented in the destination gamut and the hues are maintained.

When a sample color is matched, the colorant amounts are determined by using the mixing ratios calculated in the first projection step.

The final amounts for the two natural destination colorants ($a_{P1N}$, $a_{P2N}$) can be calculated from the amounts ($a_{P1}$, $a_{P2}$) computed using the pseudo-color primaries by using one of the four cases. The mixing ratio for the projected destination colorants is also assumed in these equations to be 1 for the first component $a_1$ and 0 for the second component $a_2$.

Case 1: Both bounding pseudo colorants are projected destination colorants.

$a_{P1N} = a_{P1}$ $a_{P2N} = a_{P2}$

Case 2: The most clockwise pseudo colorant $a_1$, is a projected destination colorant and the other $a_{P2}$ is source colorant.

$a_{P1N} = a_{P1} + a_{P2}(a_1)_j$ $a_{P2N} = a_{P2}(a_2)_j$

Case 3: The most clockwise pseudo colorant $a_{P1}$ is a source colorant and the other $a_{P2}$ is a projected destination colorant.

$a_{P1N} = a_{P1}(a_1)_i$ $a_{P2N} = a_{P1}(a_1)_i + a_{P2}$

Case 4: Both bounding colorants are source colorants.

$a_{P1N} = a_{P1}(a_1) + a_{P2}(a_1)_j$ $a_{P2N} = a_{P1}(a_2) + a_{P2}(a_2)_j$

These four sets of equations can be simplified to the following pair of equations:

$a_{P1N} = a_{P1}(a_1)_i + a_{P2}a_{C1}$ $a_{P2N} = a_{P1}(a_2)_i + a_{P2}a_{C2}$ where $a_{P1}$ and $a_{P2}$ are the originally calculated destination primary amounts $a_1$ and $a_2$ are the stored mixing ratios for the primaries indexed by the current mixing region, and $a_{C1}$ and $a_{C2}$ are calculated from the following method.

if $(a_1)_j = 1.0$ then
$\quad a_{C1} = 0.0$
$\quad a_{C2} = 1.0$
else
$\quad a_{C1} = (a_1)_j$
$\quad a_{C2} = (a_2)_j$ where $j$ = index of the previous mixing region This logic assures that when two original destination primaries bound a mixing region, the $a_{P1}$ and $a_{P2}$ values will be unaffected by mixing ratios. When pseudo primaries define all or part of a mixing region, the mixing ratios will be correctly added into the final colorant amounts.

Using this technique, the mixing equations are solved as if the destination device had a transformed gamut having the twelve pseudo primaries of FIG. 10B. A point lying outside the actual destination gamut will lie within the transformed gamut, and result in computation of actual colorant amounts that preserve relative saturation within the actual gamut.

Figure 11:
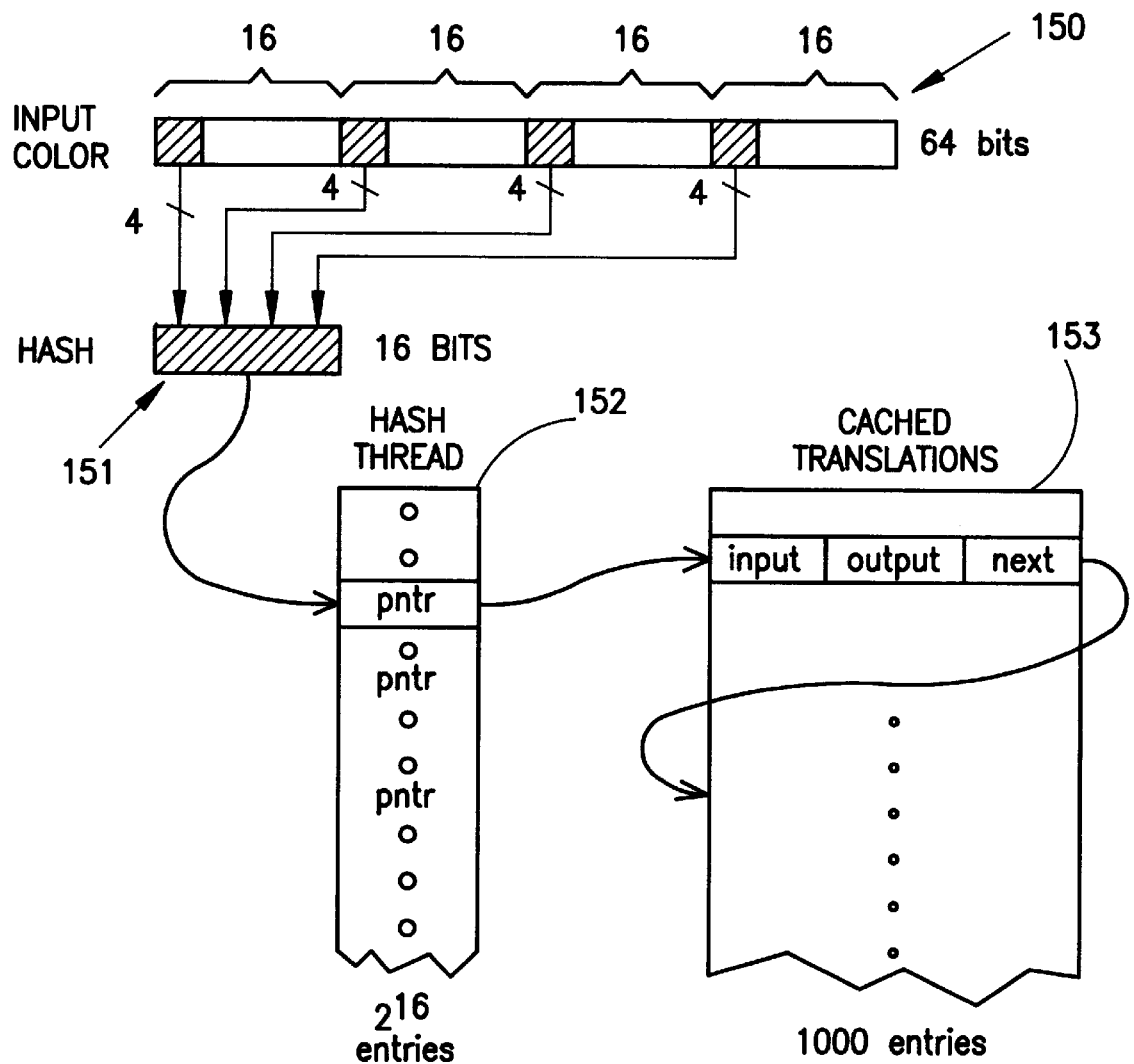
FIG. 11 is a heuristic diagram of a color translation cache according to the present invention.

FIG. 11 illustrates the implementation of the cache in one embodiment of the present invention. In the embodiment of FIG. 10, the input color 150 is represented by 4 sixteen bit bytes, each byte representing one of the three chromatic colorants and an achromatic colorant of the source device. This input color 150 is hashed by any one of a number of algorithms. In the preferred system, the first four bits of each of the 4 sixteen bit bytes of the input color are used to create a hash value. This hash value 151 is used to access a hash thread 152.

The hash thread includes $2^{16}$ entries. Each entry stores either zero or a pointer to translations in cache buffer 153. The buffer 153 includes 1000 entries in the preferred system. Each entry includes the 64 bit input color, a corresponding 64 bit output color, and a pointer to a next value in a linked list, or zero, as the pointer value. Thus, if a cache translation exists for an input color which has the same hash value, then a pointer will be found at hash thread 152. This pointer will point to a linked list of translations. The linked list is searched to determine whether a match is found. If a match is found, then a cache hit has occurred, and the translated output can be directly supplied.

Figure 12:
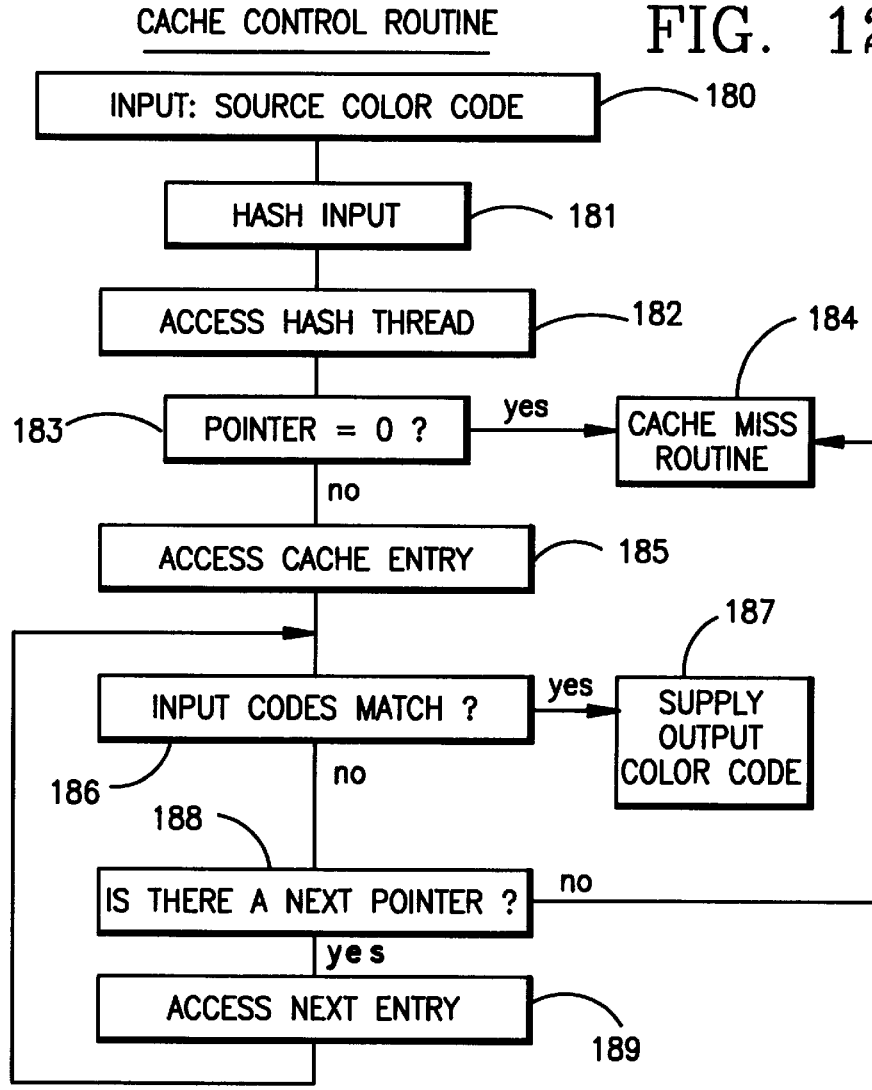
FIG. 12 is a flowchart of a cache control routine according to the present invention.

Thus, a cache control routine, as illustrated in FIG. 12, is stored in the program store of the translator illustrated in FIG. 8. The input to the cache control routine includes a source color code (block 180). First step in the routine is to hash the input value (block 181). Next, the hash thread is accessed with the result of the hashed input color (block 182).

If the hash thread pointer is equal to zero, as determined in block 183, then a cache miss has occurred, and a cache miss routine is called (block 184).

If the pointer is not equal to zero, then the cache buffer entry is accessed (block 185). The input codes are compared in block 186. If a match occurs, then the output color code is supplied (block 187). If they do not match, the next pointer is tested (block 188). If the next pointer is non-zero, then the next entry in the cache is accessed (block 189). If there is no next pointer, then the cache miss routine is called (block 184).

Figure 13:
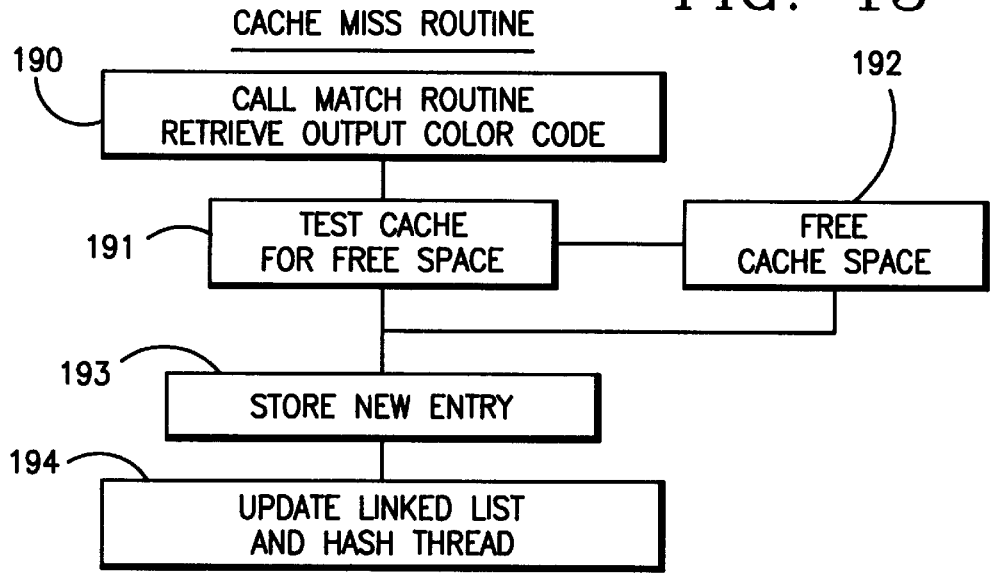
FIG. 13 is a flowchart of a cache miss routine according to the present invention.

FIG. 13 illustrates a cache miss routine. The first step in the cache miss routine is to call the match routine of the translator and retrieve an output color code (block 190).

Next, the cache buffer 153 is tested for free space (block 191). If the buffer is full, then cache space is freed (block 192). A variety of algorithms can be used for freeing cache space, such as a least recently used algorithm, or others. It is found in one implementation that once the cache buffer is full, the space can be freed by simply zeroing the hash thread table. This has the result of losing all prior stored translations, but the cache system, nonetheless, provides a significant increase in performance during translation of a given image.

If there is free cache space, then the new entry is stored in the buffer (block 193). Finally, the linked list and hash thread tables are updated (block 194).

Figure 14:
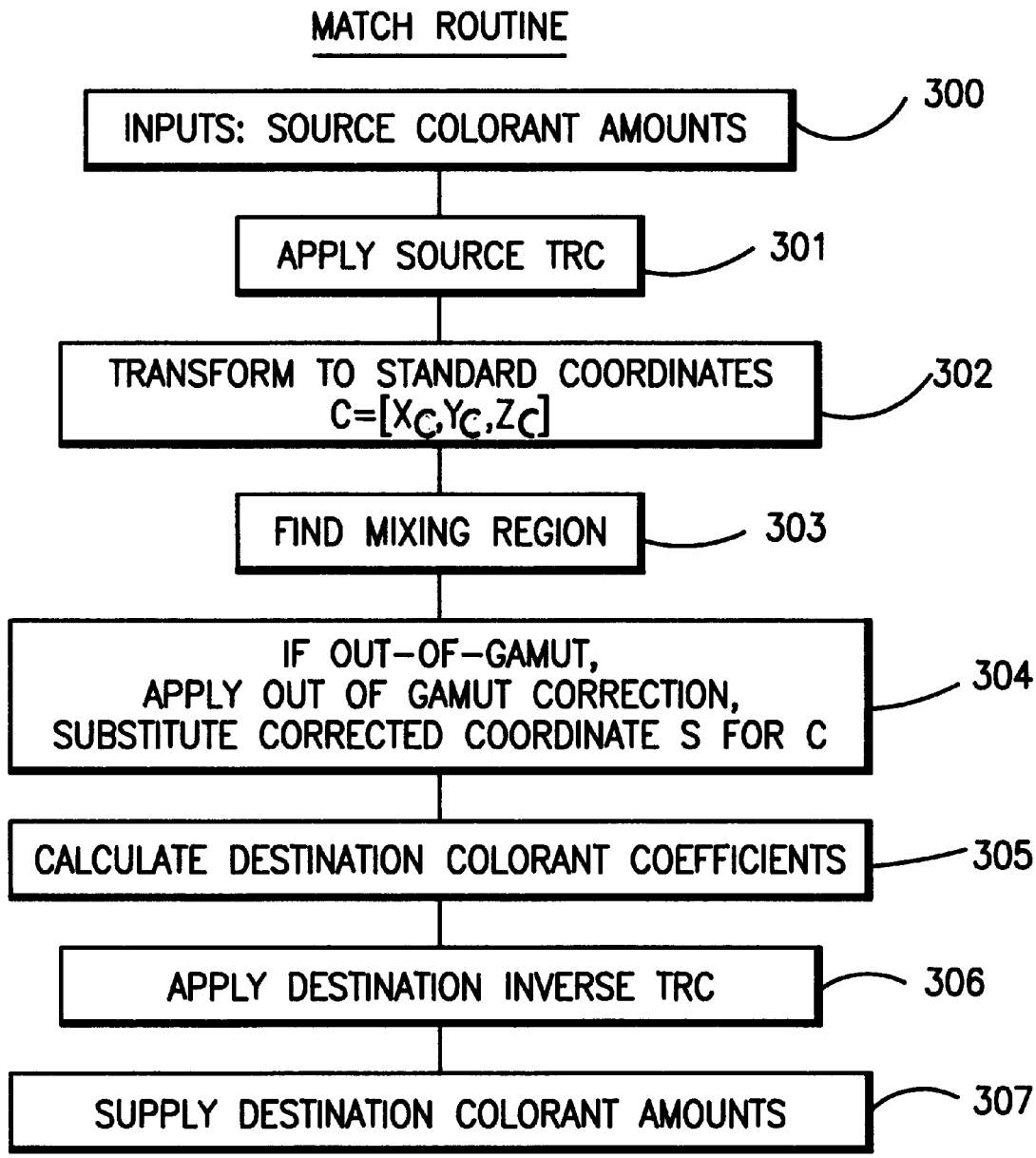
FIG. 14 is a flowchart of the matching routine according to the present invention.

FIG. 14 illustrates the match routine stored in the translator of FIG. 8. The inputs to the match routine include the source color amounts (block 300).

The first step of the match routine is to apply to the source TRC (block 301) to account for any anomalies in the source device. Of course, if the source device is a virtual device using a color space, either calibrated or uncalibrated, there may be no TRC correction necessary.

The next step is to transform the corrected colorant amounts to standard calibrated coordinate system (block 302). In the preferred system, the colorant amounts are transformed to the same coordinates in which the profiles have been specified. Again, in the preferred system, this is the CIE tristimulus coordinate space specified by the XYZ coordinates. Details of this transformation are set out below.

Next, the mixing region in which color point is found is determined (block 303). The routine for determining the mixing region is illustrated with respect to FIGS. 15 and 16 set out below.

Next it is determined whether the coordinate of the sample color is out-of-gamut, and if it is out-of-gamut, then the out-of-gamut correction routine illustrated with respect to FIGS. 17–20 is applied. The projected value S from the out-of-gamut routine is determined. This corrected coordinate S is substituted for the transform coordinate C of the color (block 304).

Finally, the destination color coefficients for the sample are calculated using the inverse matching matrices stored during, or before, initialization (block 305). Out-of-gamut detection may be made after solving the mixing equations, in which case the corrected coordinate S is used to recalculate colorant amounts. Also, other exception conditions may be detected, and corrected for. There are several exception conditions that must be solved. The first conditionals are when $Y_C > Y_W$, and $Y_C < Y_K$. They can be treated as:

when $Y_C > Y_W$, then $a_{P1}, a_{P2}, a_W, a_K = 0$ when $Y_C < Y_K$, then $a_{P1}, a_{P2}, a_W = 0$, and $a_K = 1$ This clips colors higher or lower in luminance than the white and black of the production device to the white or black of the device. This clip should be applied prior to the hextant determination step to speed processing.

The third exception condition is the case where $a_{P1} + a_{P2} + a_W > 1$ or $a_W < 0$ This case arises when the sample color is outside of the production device's color gamut.

These colorant amounts calculated in block 350 are then applied to the destination inverse TRC to account for any anomalies in the destination device (block 306). Finally, the destination colorant amounts are supplied to the destination device (block 307).

Transforming the input colorant amounts to the calibrated color space in a preferred system may be accomplished by first categorizing the various color graphics devices as an RGB type device or a CMYK type device. In one preferred system, the RGB type devices are first translated using the TRC curves to an RGB value (R', G', B'). The RGB actual value is then translated to a CMYK-linear value, according to the following equations:

$$C = 1 - R'$$

$$M = 1 - G'$$

$$Y = 1 - B'$$

$$K = 0$$

The CMYK type devices are translated to the CMYK-linear space by transforming the colorants using the TRCs. In this way, all of the source and destination devices which can be categorized in the RGB or CMYK classes, are translated to a CMYK-linear coordinate. This CMYK-linear coordinate must then be translated to an XYZ coordinate space. This is accomplished by the following computation:

$$
\begin{aligned}
K_{add} &= \min(C, M, Y) \\
C' &= C - K_{add} \\
Y' &= Y - K_{add} \\
M' &= M - K_{add} \\
K' &= \max(K' + K_{add}, 1.0) \\
R &= \min(M', Y') \\
G &= \min(C', Y') \\
B &= \min(C', M') \\
C'' &= C' - (B + G) \\
M'' &= M' - (R + B) \\
Y'' &= Y' - (R + G) \\
W &= 1.0 - C'' - M'' - Y'' - R - G - B - K'
\end{aligned}
$$

$$
\begin{bmatrix} X \\ Y \\ Z \end{bmatrix} = \begin{bmatrix} X_R & X_G & X_B & X_{C''} & X_{M''} & X_{Y''} & X_K & X_W \\ Y_R & Y_G & Y_B & Y_{C''} & Y_{M''} & Y_{Y''} & Y_K & Y_W \\ Z_R & Z_G & Z_B & Z_{C''} & Z_{M''} & Z_{Y''} & Z_K & Z_W \end{bmatrix} \begin{bmatrix} R \\ G \\ B \\ C'' \\ M'' \\ Y'' \\ K' \\ W \end{bmatrix}
$$

Figures 15, 16:
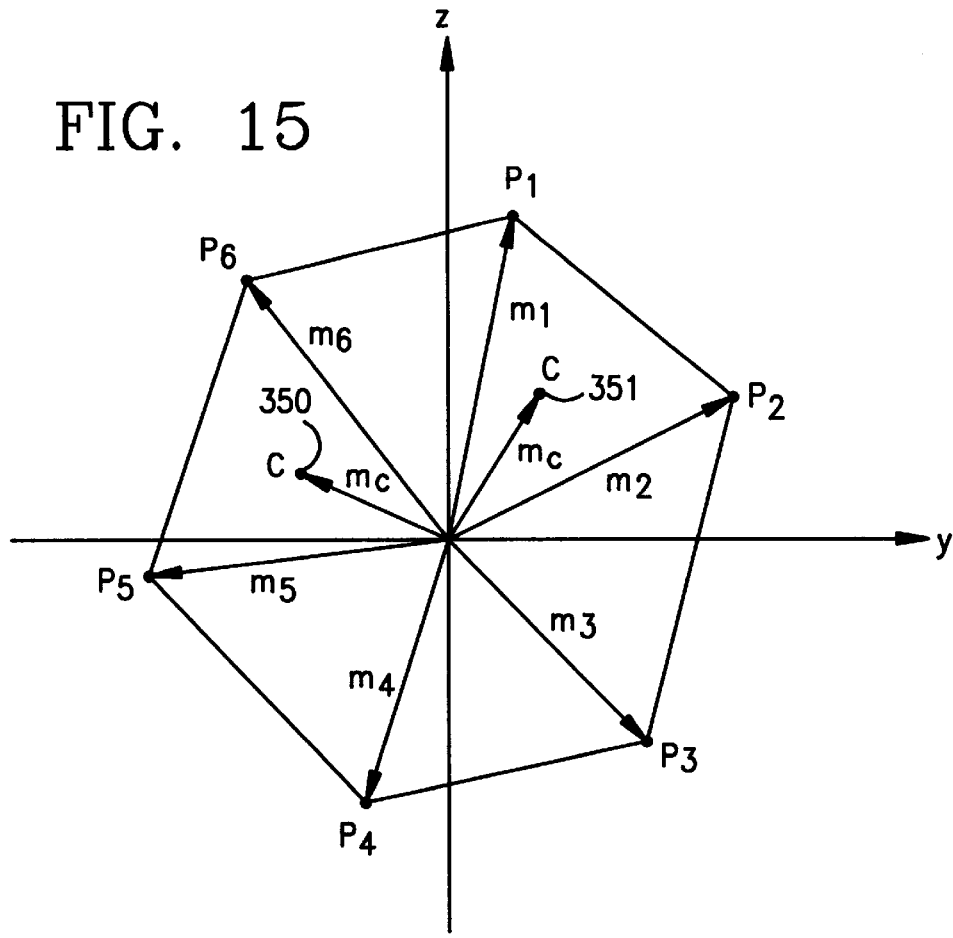
FIG. 15 is a graph used to illustrate mixing region selection according to the present invention.
FIG. 16 is a flowchart of a select mixing region routine according to the present invention.

The technique used in the match routine for finding the mixing region is illustrated with respect to FIGS. 15 and 16. FIG. 15 illustrates a gamut of a destination device which has been initialized by the initialize routine. Thus, the coordinates of each of the chromatic colorants $P_1$ through $P_6$ are prestored. Also, the slopes $m_1$ through $m_6$ are prestored during the initialize routine. Finally, the maxY and minY values for each mixing region are determined. As illustrated in FIG. 15, each of the vectors for which the slopes are calculated originate with a point on the achromatic axis of the destination device and extend to a chromatic colorant.

FIG. 15 illustrates two color samples 350 and 351. The mixing region for a given color sample C can be quickly determined by comparing the slopes of the vectors from the achromatic point to the chromatic colorants with the slope of the vector from the achromatic point to the sample C. The routine for selecting the mixing region according to the present invention in a preferred embodiment is illustrated in FIG. 16. In the first step, a "straighten" C algorithm is carried out (block 355). According to this algorithm, the coordinates of the point C are adjusted by the same amount as the gray axis adjustment, which is performed in the initialize routine.

The "straighten" coordinates $X'_C$, $Y'_C$, $Z'_C$ are calculated as follows:

$$X'_C = X_K + \frac{X_C - X_K}{Y_W - Y_B}(X_W - X_K)$$

$$Y'_C = Y$$

$$Z'_C = Z_K + \frac{Z_C - Z_K}{Y_W - Y_K}(X_W - X_K)$$

This adjustment accounts for the difference in the positions of the achromatic axes in the source and destination devices. Thus, with reference to FIG. 6, it can be seen that a point located between the achromatic axes of a source and destination device may originate in the source device in the mixing region between colorants $Y_1$ and $R_1$ but appear in a destination color gamut as residing in the mixing region between colorants $B_2$ and $C_2$. The gray axis correction routine ensures that the hue of these colors near the gray axes is maintained in the destination device.

Next, it is determined whether the X coordinate of the sample colorant C is positive or negative (block 356). If it is positive, then the routine runs the test illustrated in block 357. If X is negative, then the routine runs the test illustrated in block 358.

The test run for positive X includes comparing the slope $m_1$ with the slope $m_1$, if $m_C$ is less than $m_C$, then the mixing region is between $P_1$ and $P_6$. If the slope is not less than $m_1$, but less than $m_2$, then the mixing region is between colorants $P_2$ and $P_1$. Finally, if $m_C$ is not less than $m_2$, but less than $m_3$, then the mixing region is between colorants $P_3$ and $P_2$. If the slope $m_C$ does not meet any of the previous tests, then the mixing region is between $P_4$ and $P_3$.

If the X coordinate is negative, then the complementary tests in block 358 are run.

Therefore, for the point 351, the algorithm will determine first that the point C has a positive X coordinate. It will then compare the slope $m_c$ to the slope $m_1$, where the slope is equal to the Z coordinate of the colorant minus the Z coordinate of the achromatic point divided by the X component of the colorant minus the X component of the achromatic point. It will be determined that the slope $m_C$ is greater than the slope $m_1$. Therefore, the next test will be run. $m_C$ will be compared with $m_2$. It will then be determined that $m_C$ is less than $m_2$. The mixing region will have been found in two comparisons. For the point 350, searching will being at colorant $P_4$ because it will be determined that X is negative. Since the slopes $m_4$ and $m_5$ are greater than $m_C$, comparison of $m_C$ to $m_6$ will be made. Since it will be determined that $m_C$ is less than $m_6$, the mixing region is $P_6/P_5$ will have been determined in three comparisons.

As part of the initialize routine, the starting colorant for the routine selecting the mixing region is determined by selecting a colorant having a positive X value of lowest magnitude, and a colorant having a negative X value of lowest magnitude.

Thus, the searching of the colorant vectors has a first starting point for calculated points in one region of the space, and a second starting point for calculated points in a second region of the space. In this way, the length of the searches necessary to determine the mixing region can be reduced by as much as one-half.

By selecting the mixing region in response to the slopes which have been precomputed in the initialize routine, the run time of the match algorithm is greatly reduced.

Figure 17:
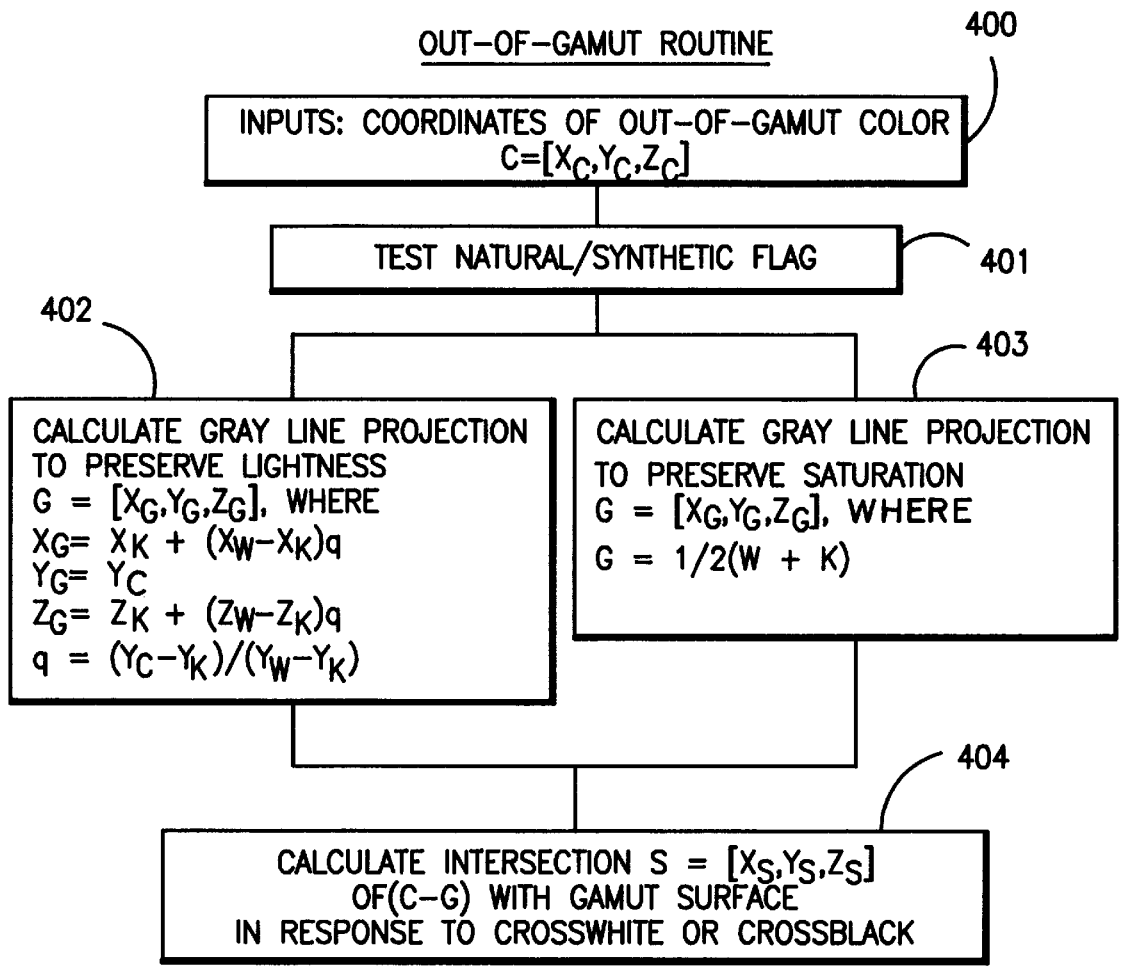
FIG. 17 is a flowchart of the out-of-gamut adjustment routine according to the present invention.

FIGS. 17–21 illustrate the out-of-gamut routine of the present invention. FIG. 17, the basic algorithm, is illustrated. The inputs to the out-of-gamut routine include the coordinates of the color to be matched (block 400). Next, the natural/synthetic flag is tested if the pseudo color transform described with respect to FIGS. 10A and 10B is not done (block 401). If the natural flag is set, then the out-of-gamut routine operates to preserve the lightness on the sample of the destination device based upon a gray line projection G calculated as shown in the figures (block 402). If the synthetic flag is set, then the out-of-gamut routine operates to preserve a different parameter, such as chromaticity or saturation, of the source color on the destination device based upon a gray line projection calculated as shown (block 403). As explained below, the out-of-gamut routine can be adapted to preserve other characteristics by the gray line projection.

Figure 18:
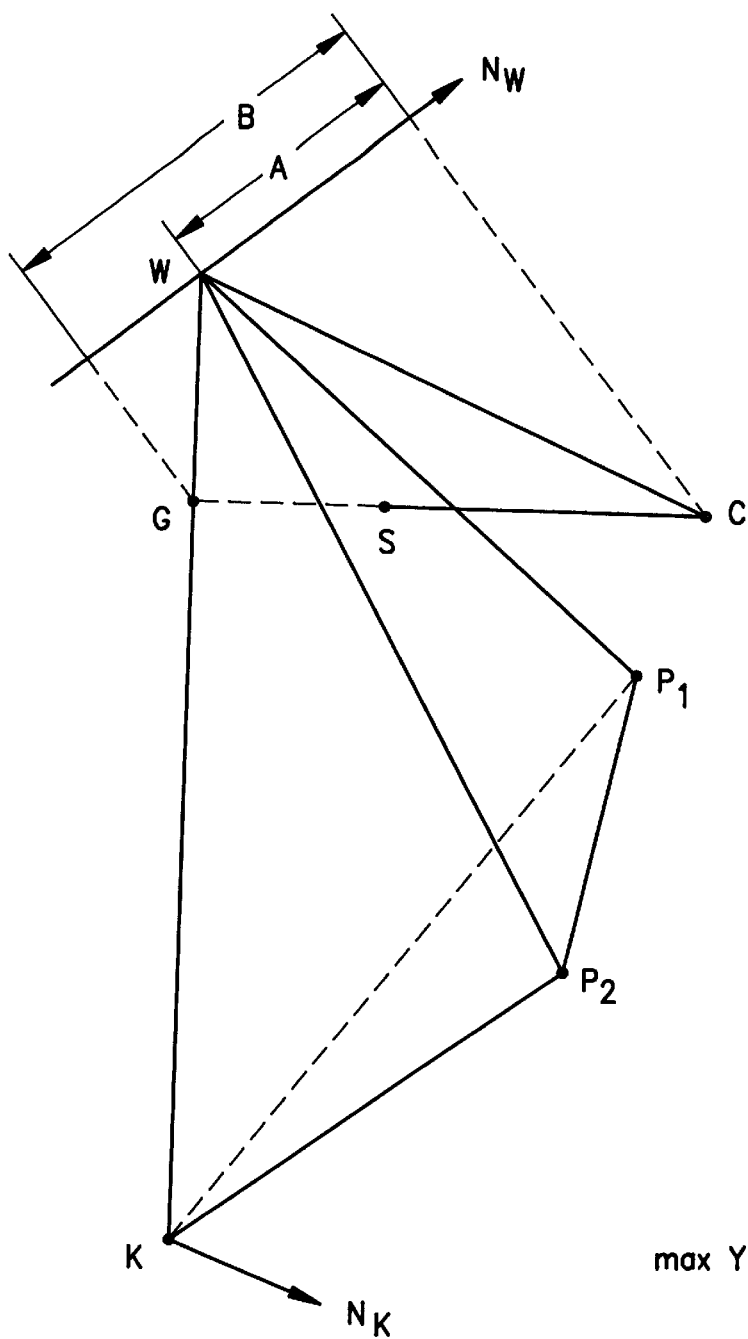
FIG. 18 is a graph of a color mixing region in a calibrated color space according to the present invention used for explaining the out-of-gamut correction routine.

If the natural flag to preserve lightness is set, then the gray line projection is calculated as illustrated in FIG. 18.

FIG. 18 illustrates a color mixing region between colorants $P_1$ and $P_2$. As described above, with respect to the initialize routine, the crosswhite $N_W$ and the crossblack $N_K$ vectors have been precalculated and are normal to the surface defined by $P_1$, $P_2$, and W, and $P_1$, $P_2$, and K, respectively. The color point coordinate C is clearly shown out of the gamut of the mixing region. In order to preserve lightness, this point C is projected onto the gray axis between W and K at a point G having the same lightness as the point C.

Figure 20:
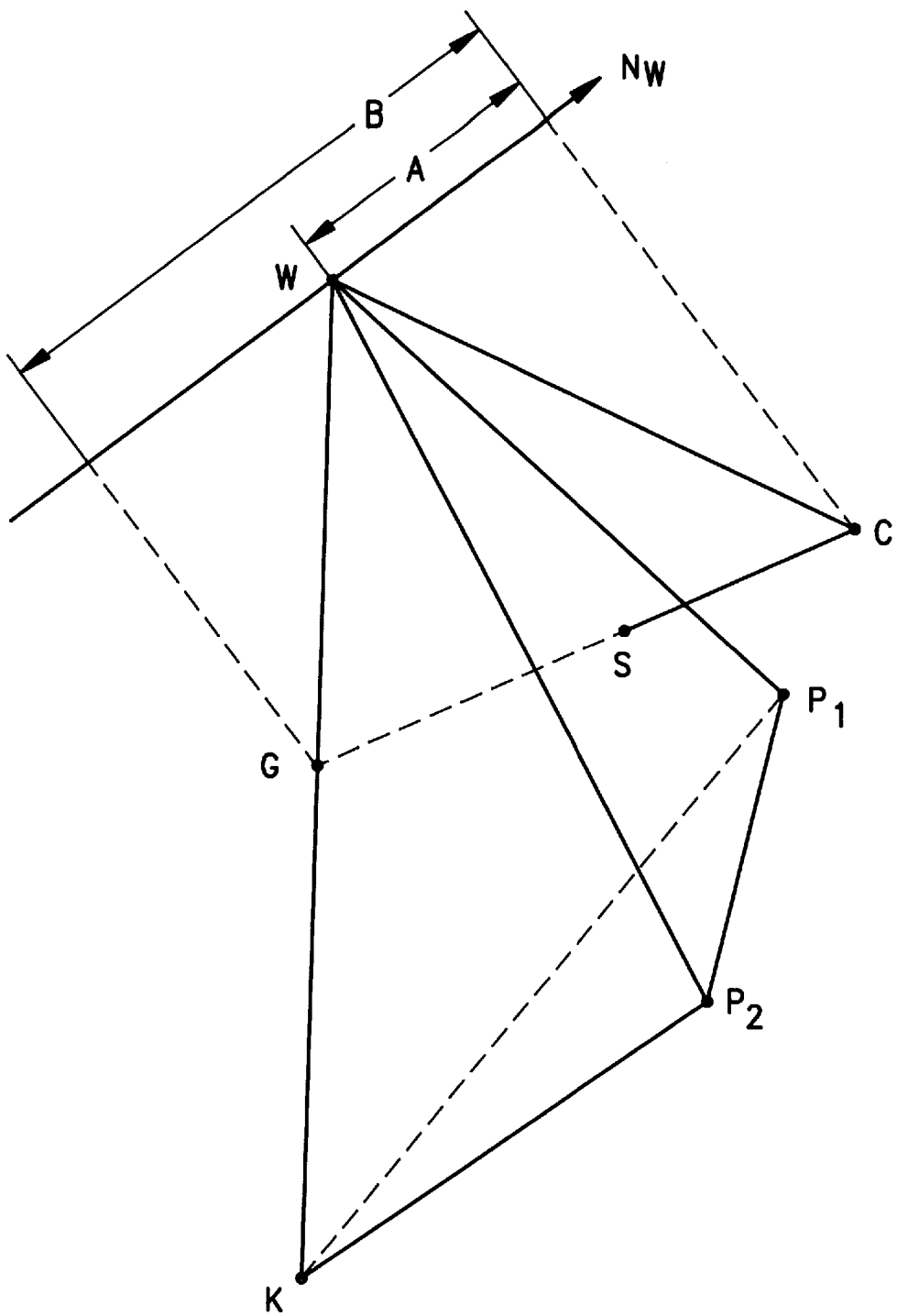
FIG. 20 illustrating an alternative out-of-gamut adjustment according to the present invention.

In FIG. 20, the gray line projection for preserving saturation is illustrated. As can be seen, this projection is calculated so that G lies at a point midway between white W and black K on the gray axis.

Figure 19:
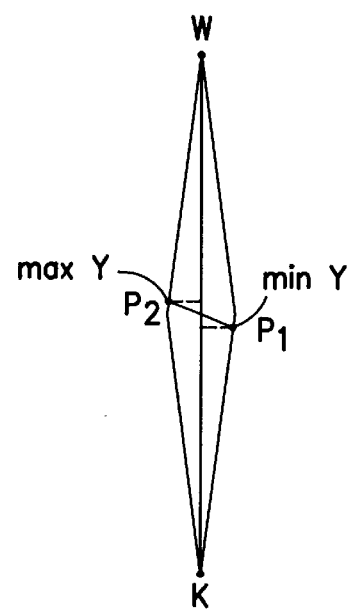
FIG. 19 is a graph of a color mixing region used to illustrate a portion of the out-of-gamut routine according to the present invention.

Finally, the routine calculates the intersection point S of the vector between C and G with the gamut surface in response to the crosswhite and crossblack vectors (block 404). This routine is illustrated in FIG. 21. The first step is to test the Y coordinate of the color C against the maxY value which has been prestored (block 410). This maxY value is illustrated in FIG. 19. As can be seen, the coordinates of the colorants $P_1$ and $P_2$ typically will not have the same Y value. Thus, the highest Y value of the coordinates of the colorants $P_1$ and $P_2$ is set equal to maxY and the lowest Y value of the coordinate of the colorants $P_1$ and $P_2$ is set equal to minY.

As illustrated in FIG. 21, if the Y coordinate of the sample C is less than maxY, then the values A, B, and $t_K$ are calculated as illustrated in block 411, where the vector [C-G] is the vector between the points C and G and the vector [C-K] is the vector between points C and K on FIG. 21. The dot products of these vectors with the crossblack vector are used to calculate the parameters A and B in this set.

Next, if the value Y of the sample C is greater than minY (block 412), then the parameters A, B, and $t_W$ are calculated as illustrated in block 413. In block 413, the values A and B are determined by the dot products of the vectors [C-G] with crosswhite and [C-W] with crosswhite as shown in FIG. 19. Therefore, the value A is a projection along the crosswhite vector $N_W$ of the vector between the points W and C. Similarly, the value B is a projection of the vector between C and G on the crosswhite vector $N_W$. The ratio of B to A is a parameter $t_W$ indicating the relative lengths of [C-S] and [S-G].

In the next step, it is determined whether to use the projections from crosswhite or crossblack in order to calculate the point S, if both have been calculated (block 414). Thus, if the Y of the sample C is both less than maxY and greater than miny, then the factor t is selected as the maximum of $t_W$ and $t_K$. Otherwise, t is the calculated value of $t_W$ or $t_K$. In the illustration in FIG. 18, the t will be equal to $t_W$, because the Y value of C is not less than maxY, but is greater than minY. Thus, only $t_W$ is calculated.

Finally, the coordinates of the point S are calculated as illustrated in block 415 of FIG. 21. This yields a point on the surface of the mixing region having the same lightness as the point C as illustrated in FIG. 18.

Applying the same calculations to the illustration in FIG. 20 used in the synthetic case, the sample S has the coordinates on the surface of the destination gamut which preserves well the chromaticity component of the point C.

As can be seen, the out-of-gamut projection can be adapted to produce a variety of effects by changing the gray line projection. However, the algorithm for calculating the surface intersection does not change. Thus, the algorithm according to the present invention is very flexible in achieving a variety of color effects for out-of-gamut corrections and accommodates software selectable flags for adapting out-of-gamut corrections.

FIG. 22 is a schematic diagram of an alternative color translator system according to the present invention. The components in FIG. 22 that are common with FIG. 8 are given like reference numbers. In this system, the translator is enhanced by including an integrated circuit matrix multiplier 500. The initialize routine in the program memory 106 is modified in this embodiment so that upon precomputing the inverse matching matrices, registers 501 in the matrix multiplier IC 500 are preloaded with the calculated values. In the matching routine, the matrix multipliers utilize the preloaded registers to perform the colorant determination. By using integrated circuit matrix multiplier, having a plurality of matrix multipliers integrated on a single chip, one matrix multiplier can be initialized for each of the mixing regions. When the match routine is executed, the matrix multiplication used to calculate the colorants for the destination device can be accomplished in hardware, greatly increasing the speed performance of the system.

Conclusion

The present invention provides a color matching system which is greatly improved over the prior art systems in speed and flexibility. It allows use of a single color translator for a variety of independently specified source and destination devices. It allows for flexible choices in the type of color matching to be performed, either to preserve natural features of the color, or true chromatic matching. Also, the out-of-gamut routine is flexible and efficient.

Several possible speed enhancements are also available according to the present invention. For instance, color matching could be performed by creating a set of color tables during initialization and prior to image production. This could be achieved in two ways. A first method would be to create a fixed size table when the output device is chosen. Interpolation could be used for intermediate values with sufficiently large precomputed tables, image quality could be quite good for most graphics.

A second method would involve using an extensible table, filled with a number of values upon initialization, and extended with values computed as the translator comes across new colors. Initialized or previously matched colors are looked up in the table. This method will use less storage than a precomputed large table according to the first method, but still allow very high quality translations.

Also, the central processing unit used in the translator can be varied as suits the need of a particular system. The preferred system is an Apple Macintosh processor. However, any type of computer device can be used. Also, specially adapted CPUs may be created to achieve the color matching incorporating matrix multiplication features and the like.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for translating input data identifying colorant amounts in a color pixel from a source color graphic device to output data identifying colorant amounts in a color pixel in a destination color graphic device, comprising the steps of:

correcting the input data for anomalies in the source color graphic device;

converting the corrected input data to coordinates of a color point in a calibrated color space;

calculating colorant amounts for the destination device in response to the coordinates of the color point in the calibrated color space;

correcting the calculated colorant amounts for anomalies in the destination device; and applying the corrected colorant amounts to the destination device, wherein the destination device has a color profile including coordinates in the calibrated color space of a plurality of chromatic colorants and at least one achromatic colorant produced by the destination device, and including mixing regions within the calibrated color space within which a point representing a color in the calibrated color space may be represented by a mixture including two chromatic colorants produced in the destination device; and wherein the step of calculating colorant amounts for the destination device comprises the steps of determining slopes of colorant vectors from an achromatic point to the coordinates of each of the plurality of colorants;

determining a slope of a sample vector from the achromatic point to the coordinates of the color point; and selecting a mixing region in response to a comparison the slope of the sample vector to determined slopes of the colorant vectors.

2. The method of claim 1, wherein the calibrated color space is CIE tristimulus space.

3. The method of claim 2, wherein the step of calculating clolorant amounts comprises:

selecting a mixing region within the calibrated color space within which the color point is represented by a mixture including chromatic colorants $P_1$ and $P_2$ and achromatic colorants W and K produced in the destination device; and computing the colorant amounts in response to the selected mixing region.

4. A method for translating input data identifying colorant amounts in a color pixel from a source color graphic device to output data identifying colorant amounts in a color pixel in a destination color graphic device, comprising the steps of:

correcting the input data for anomalies in the source color graphic device;

converting the corrected input data to coordinates of a color point in a calibrated color space;

calculating colorant amounts for the destination device in response to the coordinates of the color point in the calibrated color space;

correcting the calculated colorant amounts for anomalies in the destination device; and applying the corrected colorant amounts to the destination device, wherein the calibrated color space is CIE tristimulus space, and wherein the step of calculating colorant amounts comprises the steps of selecting a mixing region within the calibrated color space within which the color point is represented by a mixture including chromatic colorants $P_1$ and $P_2$ and achromatic colorants W and K produced in the destination device; and computing the colorant amounts in response to the selected mixing region wherein the destination device has a color profile including coordinates in the calibrated color space of a plurality of chromatic colorants and at least one achromatic colorant produced by the destination device, and wherein the step of selecting a mixing region comprises the steps of determining slopes of colorant vectors from an achromatic point to the coordinates of each of the plurality of colorants;

determining a slope of a sample vector from the achromatic point to the coordinates of the color point; and selecting a mixing region in response to a comparison the slope of the color vector to determined slopes of the colorant vectors.

5. A method for translating input data identifying colorant amounts in a color pixel from a source color graphic device to output data identifying colorant amounts in a color pixel in a destination color graphic device, comprising the steps of:

correcting the input data for anomalies in the source color graphic device;

converting the corrected input data to coordinates of a color point in a calibrated color space;

calculating colorant amounts for the destination device in response to the coordinates of the color point in the calibrated color space;

correcting the calculated colorant amounts for anomalies in the destination device; and applying the corrected colorant amounts to the destination device. wherein the calibrated color space is CIE tristimulus space, and wherein the step of calculating colorant amounts comprises the steps of selecting a mixing region within the calibrated color space within which the color point is represented by a mixture including chromatic colorants $P_1$ and $P_2$ and achromatic colorants W and K produced in the destination device; and computing the colorant amounts in response to the selected mixing region wherein the step of computing the colorant amounts comprises the step of solving mixing equations for the selected mixing region as follows $$[a_{P1}\ a_{P2}\ a_W] = \begin{bmatrix} X_C - X_K \\ Y_C - Y_K \\ Z_C - Z_K \end{bmatrix} [H_M]^{-1}$$

where $$[H_M]^{-1} = \begin{bmatrix} X_{P1} - X_K & X_{P2} - X_K & X_W - X_K \\ Y_{P1} - Y_K & Y_{P2} - Y_K & Y_W - Y_K \\ Z_{P1} - Z_K & Z_{P2} - Z_K & Z_W - Z_K \end{bmatrix}^{-1}$$

where the coordinates of the chromatic colorants $P_i$ are $(X_{Pi}, Y_{Pi}, Z_{Pi})$, and the coordinates of the achromatic colorant w is $(X_W, Y_W, Z_W)$ and the achromatic colorant K is $(X_K, Y_K, Z_K)$.

6. A method for translating input data identifying colorant amounts in a color pixel from a source color graphic device to output data identifying colorant amounts in a color pixel in a destination color graphic device, comprising the steps of:

correcting the input data for anomalies in the source color graphic device;

converting the corrected input data to coordinates of a color point in a calibrated color space;

calculating colorant amounts for the destination device in response to the coordinates of the color point in the calibrated color space;

correcting the calculated colorant amounts for anomalies in the destination device; and applying the corrected colorant amounts to the destination device, wherein the destination device has a color gamut, and further including the steps of detecting whether the color point lies outside the color gamut of the destination device; and if the color point lies outside the gamut, then computing a sample point within the gamut matching the color point according to a predetermined function, and using the sample point in place of the color point to calculate colorant amounts for the destination device.

7. The method of claim 6, wherein the predetermined function preserves lightness of the color point.

8. The method of claim 6, wherein the predetermined function preserves saturation of the color point.

9. The method of claim 6, wherein the step of detecting whether the color point lies outside the color gamut is responsive to the calculated colorant amounts.

10. The method of claim 6, wherein the destination device has a color profile including coordinates in the color space of colorants produced by the destination device and mixing regions within which a point representing a color in the calibrated color space may be represented by a mixture including two chromatic colorants produced in the destination device, further including:

computing a crosswhite vector and a crossblack vector for each of the mixing regions, wherein the crosswhite vector is normal to a surface defined by coordinates of a colorant representing white and of the two chromatic colorants of the mixing region for the destination device, and the crossblack vector is normal to a surface defined by coordinates of a colorant representing black and of the two chromatic colorants of the mixing region for the destination device; and wherein the step of computing a sample point is responsive to at least one of the crosswhite or crossblack vectors.

11. The method of claim 10, wherein the step of computing a sample point within the gamut includes:

computing a coordinates of gray point along a line between achromatic colorants of the destination device; and computing the sample point in response to the gray point and one of crosswhite and crossblack vectors.

12. An apparatus for translating input data identifying colorant amounts in a color pixel from a first color graphic device to output data identifying colorant amounts in a color pixel in a second color graphic device, comprising:

a profile store storing profiles of the first and second color graphic devices in a calibrated color space, including coordinates within the calibrated color space of colorants produced in the second color graphic device;

a translation cache for storing translations from the input data to the output data;

means, responsive to the input data, for searching the translation cache for a translation to the output data, and if found supplying the output data;

a translation module, responsive to the input data if a translation is not found in the translation cache, for translating the input data to the output data in response to the stored profiles; and means, coupled with the translation module and the translation cache, for updating the translation cache.

13. The apparatus of claim 12, wherein at least one of the first and second color graphic devices comprises a virtual device.

14. The apparatus of claim 12, wherein the translation module comprises:

means, responsive to the input data, for calculating a point in the calibrated color space for the color pixel;

means, responsive to the calculated point and the stored profile of the second color graphic device, for selecting a mixing region for the calculated point, wherein a mixing region comprises a region within the calibrated color space, within which a point representing a color in the calibrated color space is represented by a mixture including only two chromatic colorants produced in the second color graphic device;

means, responsive to the selected mixing region, for calculating the mixture of colorants in the second color graphic device; and means, responsive to the calculated mixture, for supplying the output data.

15. The apparatus of claim 14, wherein the means for calculating the mixture of colorants includes an integrated circuit matrix multiplier.

16. An apparatus for translating input data identifying colorant amounts in a color pixel from a first color graphic device to output data identifying colorant amounts in a color pixel in a second color graphic device, comprising:

means for receiving independently derived profiles of the first and second color graphic devices in a calibrated color space;

first initializing means, responsive to the received profiles, for computing mixing matrices for a plurality of mixing regions within the calibrated color space, wherein each of the plurality of mixing regions consist of areas in the calibrated color space of the second color graphic device within which a point representing a color in the calibrated color space is represented by a mixture including only two chromatic colorants produced in the second color graphic device;

means, responsive to the input data, for calculating a point in the calibrated color space for the color pixel;

means, responsive to the calculated point, for selecting a mixing region for the calculated point;

means, responsive to the calculated point and the stored mixing matrix for the selected mixing region, for calculating the mixture of colorants in the second color graphic device; and means, responsive to the calculated mixture, for supplying the output data.

17. The apparatus of claim 16, wherein the first initializing means further includes means for computing coordinates of pseudo-colorants for the second color graphic device in the calibrated color space corresponding to chromatic colorants produced in a first color graphic device, and for utilizing the pseudo-colorants in the computation of mixing matrices.

18. The apparatus of claim 16, further including second initializing means, responsive to the received profiles, for computing a correction factor according to differences between the first and second color graphic devices; and wherein the means for calculating a point in the calibrated color space is further responsive to the correction factor.

19. The apparatus of claim 18, wherein the correction factor computed by the second initializing means comprises an adjustment factor to correct for differences between gray axes in the calibrated color space for the first and second color graphic devices.

20. The apparatus of claim 16, further including:

third initializing means for computing slopes of vectors from an achromatic point to coordinates of chromatic colorants of the second color graphic device; wherein the means for selecting a mixing region includes:

means for calculating a slope from an achromatic point to the calculated point; and means for searching the stored slopes to identify the mixing region in response to the calculated slope.

21. The apparatus of claim 20, wherein the means for searching includes means, responsive to the calculated point, for selecting a starting chromatic colorant; and means, responsive to the calculated point, for comparing the calculated slope to the stored slopes starting with the stored slope of the vector to the starting chromatic colorant, for identifying the mixing region.

22. The apparatus of claim 21, wherein the means for selecting a starting chromatic colorant includes means, responsive to the calculated point and the coordinates of the chromatic colorants, for selecting a first chromatic colorant as the starting chromatic colorant for calculated points having a positive coordinate in a selected dimension of the calibrated color space, and selecting a second chromatic colorant as the starting chromatic colorant for calculated points having a negative coordinate in the selected dimension.

23. The apparatus of claim 22, wherein the first chromatic colorant is the chromatic colorant having a positive coordinate in the selected dimension with a smallest magnitude of the plurality of chromatic colorants, and the second chromatic colorant is the chromatic colorant having a negative coordinate in the selected dimension with a smallest magnitude of the plurality of chromatic colorants.

24. The apparatus of claim 16, wherein the first initializing means further includes:

means for computing a crosswhite vector and a crossblack vector for each of the mixing regions, wherein the crosswhite vector is normal to a surface defined by coordinates of a colorant representing white and of the two chromatic colorants of the mixing region for the second color graphic device, and the crossblack vector is normal to a surface defined by coordinates of a colorant representing black and of the two chromatic colorants of the mixing region for the second color graphic device; and further including means, responsive a calculated point outside the gamut of the second color graphic device, for determining a sample point within the gamut of the second color graphic device in response to the crosswhite vector or the crossblack vector.

25. The apparatus of claim 24, wherein the means for determining a sample point within the gamut includes:

means for computing a point on a gray axis of the second color graphic device and for computing the sample point in response to the computed gray axis point.

26. The apparatus of claim 16, wherein the received profiles include tonal reproduction curves for the first and second color graphic devices, and further including:

means, responsive to a tonal reproduction curve for the first color graphic device, for compensating the input data for anomalies of the first color graphic device; and means, responsive to a tonal reproduction curve for the second color graphic device, for compensating the output data for anomalies expected in the second color graphic device.

27. An apparatus for translating input data identifying colorant amounts in a color pixel from a first color graphic device to output data identifying colorant amounts in a color pixel in a second color graphic device, comprising:

a profile store for storing profiles of the first and second color graphic devices in a calibrated color space, the profiles including mixing matrices for a plurality of mixing regions within the calibrated color space, wherein each of the plurality of mixing regions consist of areas within which a point representing a color in the calibrated color space is represented by a mixture including only two chromatic colorants produced in the second color graphic device;

means, responsive to the input data, for calculating a point in the calibrated color space for the color pixel;

means, responsive to the calculated point, for selecting a mixing region for the calculated point;

means, responsive to the calculated point and the stored mixing matrix for the selected mixing region, for calculating the mixture of colorants in the second color graphic device; and means, responsive to the calculated mixture, for supplying the output data.

28. The apparatus of claim 27, wherein the profiles in the profile store include slopes of vectors from an achromatic point to coordinates of chromatic colorants of the second color graphic device; and the means for selecting the mixing region includes:

means for calculating a slope from an achromatic point to the calculated point; and means for searching the stored slopes to identify the mixing region in response to the calculated slope.

29. The apparatus of claim 28, wherein the means for searching includes means, responsive to the calculated point, for selecting a starting chromatic colorant; and means, responsive to the calculated point, for comparing the calculated slope to the stored slopes starting with the stored slope of the vector to the starting chromatic colorant, for identifying the mixing region.

30. The apparatus of claim 29, wherein the means for selecting a starting chromatic colorant includes means, responsive to the calculated point and the coordinates of the chromatic colorants, for selecting a first chromatic colorant as the starting chromatic colorant for calculated points having a positive coordinate in a selected dimension of the calibrated color space, and selecting a second chromatic colorant as the starting chromatic colorant for calculated points having a negative coordinate in the selected dimension.

31. The apparatus of claim 30, wherein the first chromatic colorant is the chromatic colorant having a positive coordinate in the selected dimension with a smallest magnitude of the plurality of chromatic colorants, and the second chromatic colorant is the chromatic colorant having a negative coordinate in the selected dimension with a smallest magnitude of the plurality of chromatic colorants.

32. The apparatus of claim 27, wherein the profiles stored in the profile store include coordinates of pseudo-colorants for the second color graphic device in the calibrated color space corresponding to chromatic colorants produced in the first color graphic device, and mixing matrices based upon the pseudo-colorants.

33. The apparatus of claim 27, wherein the profiles stored in the profile store further include a correction factor according to differences between the first and second color graphic devices; and wherein the means for calculating a point in the calibrated color space is further responsive to the correction factor.

34. The apparatus of claim 33, wherein the correction factor comprises an adjustment factor to correct for differences between gray axes in the calibrated color space for the first and second color graphic devices.

35. The apparatus of claim 27, wherein the profiles stored in the profile store further include a crosswhite vector and a crossblack vector for each of the mixing regions, wherein the crosswhite vector is normal to a surface defined by coordinates of a colorant representing white and of the two chromatic colorants of the mixing region for the second color graphic device, and the crossblack vector is normal to a surface defined by coordinates of a colorant representing black and of the two chromatic colorants of the mixing region for the second color graphic device; and further including means, responsive a calculated point outside the gamut of the second color graphic device, for determining a sample point within the gamut of the second color graphic device in response to the crosswhite vector or the crossblack vector.

36. The apparatus of claim 35, wherein the means for determining a sample point within the gamut includes:

means for computing a point on a gray axis of the second color graphic device and for computing the sample point in response to the computed gray axis point.

37. The apparatus of claim 27, wherein the profiles stored in the profile store include tonal reproduction curves for the first and second color graphic devices, and further including:

means, responsive to a tonal reproduction curve for the first color graphic device, for compensating the input data for anomalies of the first color graphics device; and means, responsive to a tonal reproduction curve for the second color graphic device, for compensating the output data for anomalies expected in the second color graphic device.

38. A method for translating input data identifying colorant amounts in a color pixel from a first color graphic device to output data identifying colorant amounts in a color pixel in a second color graphic device, comprising the steps of:

transforming prespecified color gamuts for the first and second color graphic devices into a transformed color gamut in a calibrated color space;

identifying a point in the calibrated color space for the color pixel in response to the input data;

computing a mixture of colorants for the second color graphic device in response to the point in the calibrated color space and the transformed color gamut; and supplying the mixture of colorants as the output data to the second color graphic, device, wherein the prespecified color gamuts include coordinates in the calibrated color space of achromatic colorants for the first and second color graphic devices, and the step of transforming prespecified color gamuts includes the step of mapping the coordinates of the achromatic colorants in the prespecified color gamut of the second color graphic device into the coordinants of the achromatic colorants in the prespecified color gamut of the first color graphic device.

39. A method for translating input data identifying colorant amounts in a color pixel from a first color graphic device to output data identifying colorant amounts in a color pixel in a second color graphic device, comprising the steps of:

transforming prespecified color gamuts for the first and second color graphic devices into a transformed color gamut in a calibrated color space;

identifying a point in the calibrated color space for the color pixel in response to the input data;

computing a mixture of colorants for the second color graphic device in response to the point in the calibrated color space and the transformed color gamut; and supplying the mixture of colorants as the output data to the second color graphic device, wherein the step of computing a mixture of colorants includes the steps of computing mixing matrices for a plurality of mixing regions in response to the transformed color gamut within the calibrated color space, wherein each of the plurality of mixing regions consist of areas within which a point calculated representing a color in the calibrated color space may be represented by a mixture including only two colorants in the transformed gamut;

identifying a mixing region within the transformed color gamut for the calculated point; and computing the mixture of colorants for the second color graphic device in response to the mixing matrix for the identified mixing region.

40. The method of claim 39, wherein the prespecified color gamuts include coordinates in the calibrated color space of chromatic colorants for the first and second color graphic devices, and the step of transforming prespecified color gamuts includes:

translating the coordinates of the chromatic colorants in the prespecified color gamut of the first color graphic device into first translated coordinates in the prespecified color gamut of the second color graphic device;

computing mixing ratios of chromatic colorants in the prespecified color gamut of the second color graphic device in response to the first translated coordinates;

translating the coordinates of the chromatic colorants in the prespecified color gamut of the second color graphic device into second translated coordinates in the prespecified color gamut of the first color graphic device; and forming mixing regions for the transformed color gamut in response to the coordinates of the chromatic colorants from the prespecified color gamut of the first color graphic device and to the second translated coordinates of the chromatic colorants from the prespecified color gamut of the second color graphic device; and wherein the step of computing the mixture of colorants for the second color graphics device includes translating amounts of chromatic colorants from the prespecified color gamut of the first color graphic device used to form mixing regions to amounts of colorants for the second color graphic device in response to the mixing ratios.

41. The method of claim 40, wherein the prespecified color gamuts include coordinates in the calibrated color space of achromatic colorants for the first and second color graphic devices, and the step of transforming prespecified color gamuts further includes:

mapping the coordinates of the achromatic colorants in the prespecified color gamut of the second color graphic device into the coordinants of the achromatic colorants in the prespecified color gamut of the first color graphic device.

42. An apparatus for translating input data identifying colorant amounts in a color pixel from a first color graphic device to output data identifying colorant amounts in a color pixel in a second color graphic device, comprising:

a profile store storing independently derived profiles of the first and second color graphic devices in a calibrated color space, including coordinates within the calibrated color space of colorants produced in the second color graphic device; and a translation module. responsive to the input data, for translating the input data to the output data in response to the stored profiles, wherein the translation module comprises means, responsive to the input data, for calculating a point in the calibrated color space for the color pixel;

means, responsive to the calculated point and the stored profile of the second color graphic device, for selecting a mixing region for the calculated point, wherein a mixing region comprises a region within the calibrated color space, within which a point representing a color in the calibrated color space may be represented by a mixture including only two chromatic colorants produced in the second color graphic device;

means, responsive to the selected mixing region, for calculating the mixture of colorants in the second color graphic device; and means, responsive to the calculated mixture, for supplying the output data.

43. The apparatus of claim 42, wherein the means for calculating the mixture of colorants includes an integrated circuit matrix multiplier.

44. An apparatus for translating input data identifying colorant amounts in a color pixel from a first color graphic device to output data identifying colorant amounts in a color pixel in a second color graphic device, comprising:

a profile store storing independently derived profiles of the first and second color graphic devices in a calibrated color space, including coordinates within the calibrated color space of colorants produced in the second color graphic device; and a translation module, responsive to the input data, for translating the input data to the output data in response to the stored profiles, wherein the translation module includes means, responsive to the stored profiles of the first and second color graphic devices, for transforming stored profiles for the first and second color graphic devices into a transformed color gamut in a calibrated color space;

means, responsive to the input data, for identifying a point in the calibrated color space for the color pixel;

means, responsive to the point in the calibrated color space and the transformed color gamut, for computing a mixture of colorants for the second color graphic device; and means, coupled with the means for computing a mixture of colorants, for supplying the mixture of colorants as the output data to the second color graphic device.

\* \* \* \* \*

UNITED STATES PATENT AND TRADEMARK OFFICE
CERTIFICATE OF CORRECTION

PATENT NO. : 5,909,291

DATED : June 1, 1999

INVENTOR(S) : Robin D. MYERS, et al.

It is certified that an error appears in the above-identified patent and that said Letters Patent is hereby corrected as shown below:

```
In Column 22, line 4, before "amounts", delete "clolorant", and insert
--colorant--;
In Column 22, lines 28 and 29, after "CIE", delete "tris-timulus", and
insert --tristimulus--;
In Column 22, line 67, and Column 23, line 1, after "CIE", delete
"tris-timulus", and insert --tristimulus--;
In Column 24, lines 24 and 25, after "of", delete "colo-rants", and
insert --colorants--;
In Column 25, lines 23 and 24, after "chromatic", delete "colo-rants",
and insert --colorants--;
In Column 28, lines 12 and 13, after "identifying", delete "colo-
rants" and insert --colorants--; and
In Column 29, line 47, after "module", delete ".", and insert --,--.
```

Signed and Sealed this

Twentieth Day of June, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,909,291  
DATED : June 1, 1999  
INVENTOR(S) : Robin D. Myers, Keith McGreggor, Robert Johnson and Konstantin Othmer It is certified that error appears in the above-identified patent and that said Letters Patent is hereby corrected as shown below:

Column 7,  
Line 67, replace "100" with -- 50 --.

Column 8,  
Line 1, replace "101" with -- 51 --.  
Line 5, replace "100" with -- 50 --.  
Line 6, replace "100" with -- 50 --.  
Line 8, replace "101" with -- 51 --.

Column 10,  
Line 47, replace "miny" with -- minY --.

Column 11,  
Line 15, replace "Reprsenting" with Representing --.  
Line 22, replace "aw" with -- $a_w$ --.

Column 15,  
Line 27, replace "FIG. 10" with -- FIG. 11 --.

Column 17,  
Line 67, replace "miny" with -- minY --.

Column 20,  
Line 18, replace "miny" with -- minY --.

Signed and Sealed this

Sixteenth Day of July, 2002

*Attest:*

JAMES E. ROGAN  
*Attesting Officer*  *Director of the United States Patent and Trademark Office*